(12) United States Patent
Konishi et al.

(10) Patent No.: US 7,358,988 B1
(45) Date of Patent: Apr. 15, 2008

(54) IMAGE SIGNAL PROCESSOR FOR PERFORMING IMAGE PROCESSING APPROPRIATE FOR AN OUTPUT DEVICE AND METHOD THEREFOR

(75) Inventors: Masahiro Konishi, Asaka (JP); Chiaki Ichikawa, Asaka (JP); Hitoshi Yamashita, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1594 days.

(21) Appl. No.: 09/635,847

(22) Filed: Aug. 11, 2000

(30) Foreign Application Priority Data

Aug. 13, 1999 (JP) ................................. 11-228950

(51) Int. Cl.
*H04N 5/228* (2006.01)

(52) U.S. Cl. .................................... 348/222.1; 348/239

(58) Field of Classification Search ............. 348/221.1, 348/370, 364, 362, 216.1, 222.1, 231.7, 231.8, 348/231.9, 218.1, 586, 231.99, 231.1, 231.2, 348/588, 239, 224.1, 280; 358/906
See application file for complete search history.

(56) References Cited

U.S. PATENT DOCUMENTS

| | | | | |
|---|---|---|---|---|
| 5,337,152 A | * | 8/1994 | Kotaki | 348/234 |
| 5,420,635 A | * | 5/1995 | Konishi et al. | 348/362 |
| 5,426,732 A | * | 6/1995 | Boies et al. | 715/839 |
| 5,606,392 A | * | 2/1997 | Tintera et al. | 396/161 |
| 5,754,709 A | * | 5/1998 | Moriya et al. | 382/274 |
| 5,821,997 A | * | 10/1998 | Kawamura et al. | 348/231.6 |
| 5,956,082 A | * | 9/1999 | Yamazaki | 348/222.1 |
| 5,969,761 A | * | 10/1999 | Takahashi et al. | 348/362 |
| 6,091,513 A | * | 7/2000 | Ishihara et al. | 358/1.9 |
| 6,144,414 A | * | 11/2000 | Toba | 348/564 |
| 6,160,532 A | * | 12/2000 | Kaburagi et al. | 345/87 |
| 6,211,911 B1 | * | 4/2001 | Komiya et al. | 348/218.1 |
| 6,211,913 B1 | * | 4/2001 | Hansen et al. | 348/239 |
| 6,313,877 B1 | * | 11/2001 | Anderson | 348/333.05 |
| 6,642,956 B1 | * | 11/2003 | Safai | 348/222.1 |
| 6,677,988 B2 | * | 1/2004 | Usami | 348/179 |
| 6,753,917 B2 | * | 6/2004 | Tanizoe et al. | 348/333.07 |
| 6,813,040 B1 | * | 11/2004 | Uchino et al. | 358/1.9 |
| 2001/0033701 A1 | * | 10/2001 | Okisu et al. | 382/284 |
| 2003/0193602 A1 | * | 10/2003 | Satoh et al. | 348/333.12 |

FOREIGN PATENT DOCUMENTS

| | | |
|---|---|---|
| JP | 59-094180 | 5/1984 |
| JP | 1-221994 | 9/1989 |
| JP | 249534 | 9/1993 |
| JP | 7-203246 | 8/1995 |
| JP | 10-178615 | 6/1998 |
| JP | 10-210323 | 8/1998 |
| JP | 11-004380 | 1/1999 |
| JP | 11-191873 | 7/1999 |
| JP | 2001-8088 | 1/2001 |

* cited by examiner

*Primary Examiner*—Lin Ye
*Assistant Examiner*—Nelson D. Hernández
(74) *Attorney, Agent, or Firm*—Birch, Stewart, Kolasch & Birch, LLP

(57) ABSTRACT

A signal processor of an electronic still camera stores image data, obtained during photographing, into a buffer memory. A gain adjusting circuit performs multiplication on the stored image data with the exposure amount changed by 0.5 EV at a time. Next, a usage-specific processor processes the image data in one of two ways to change the gradation, contour, and so on, of the image data so that the image data may be output appropriately to a CRT or a printer.

43 Claims, 12 Drawing Sheets

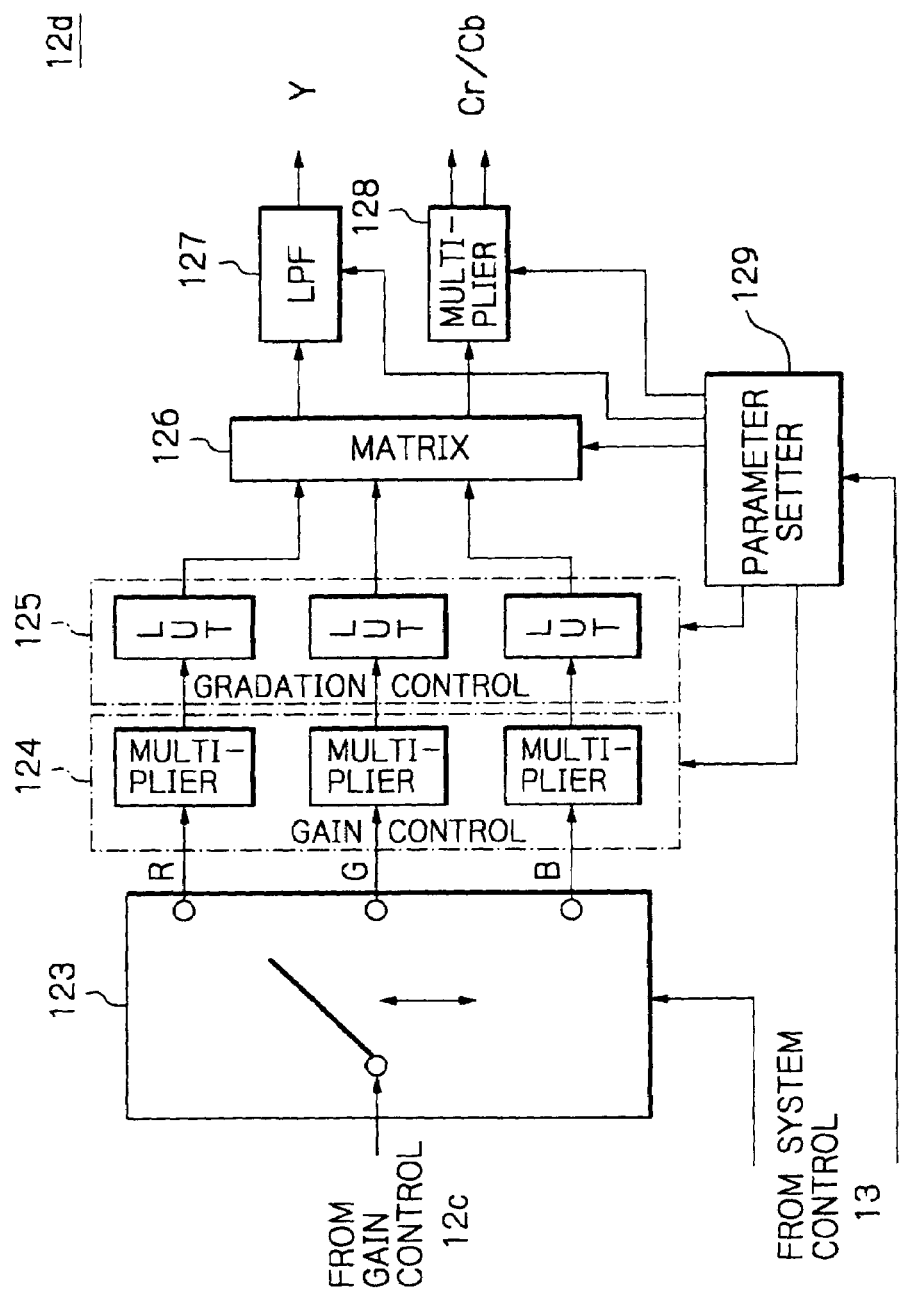

CONTRAST DECREASING

CONTRAST INCREASING

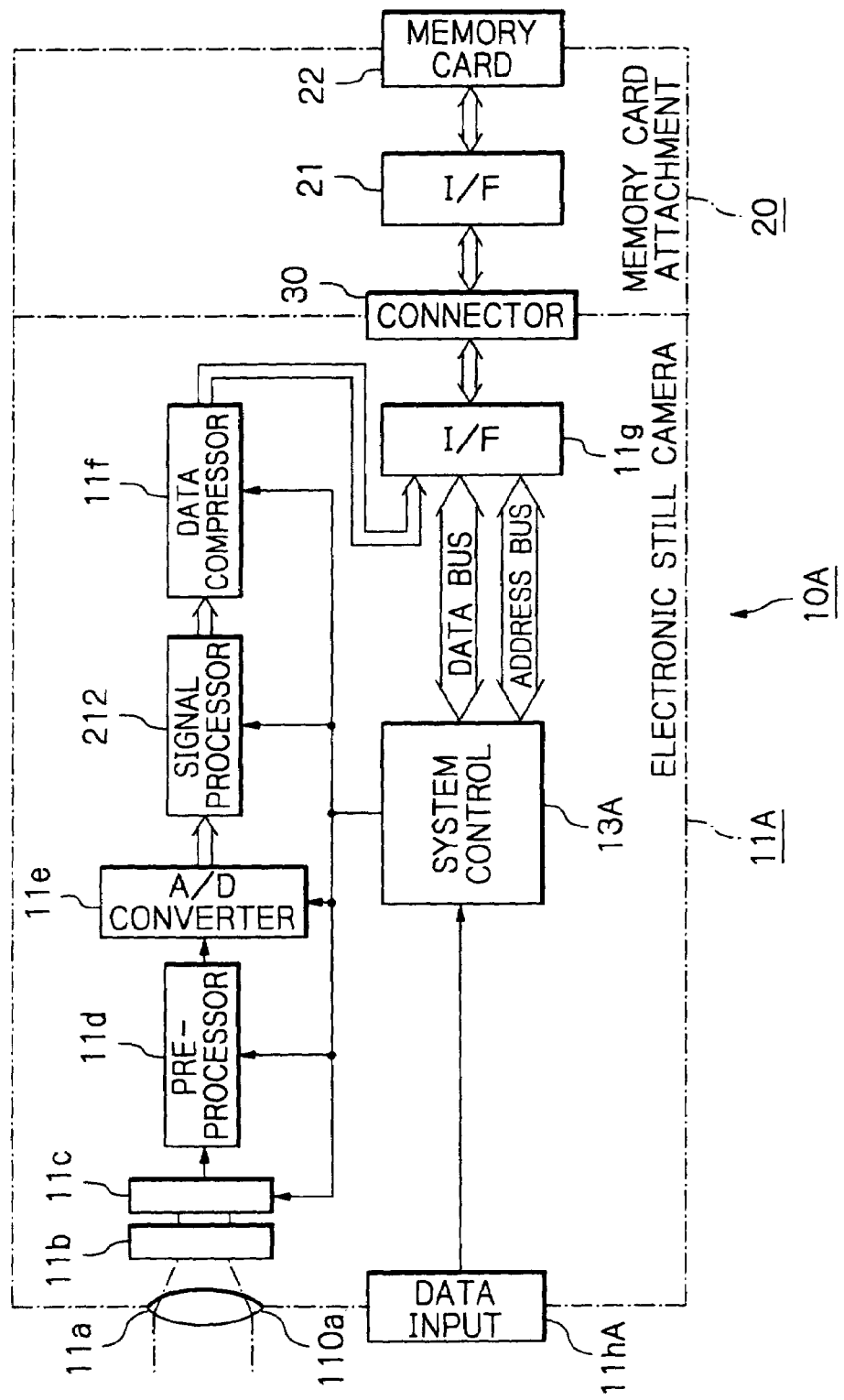

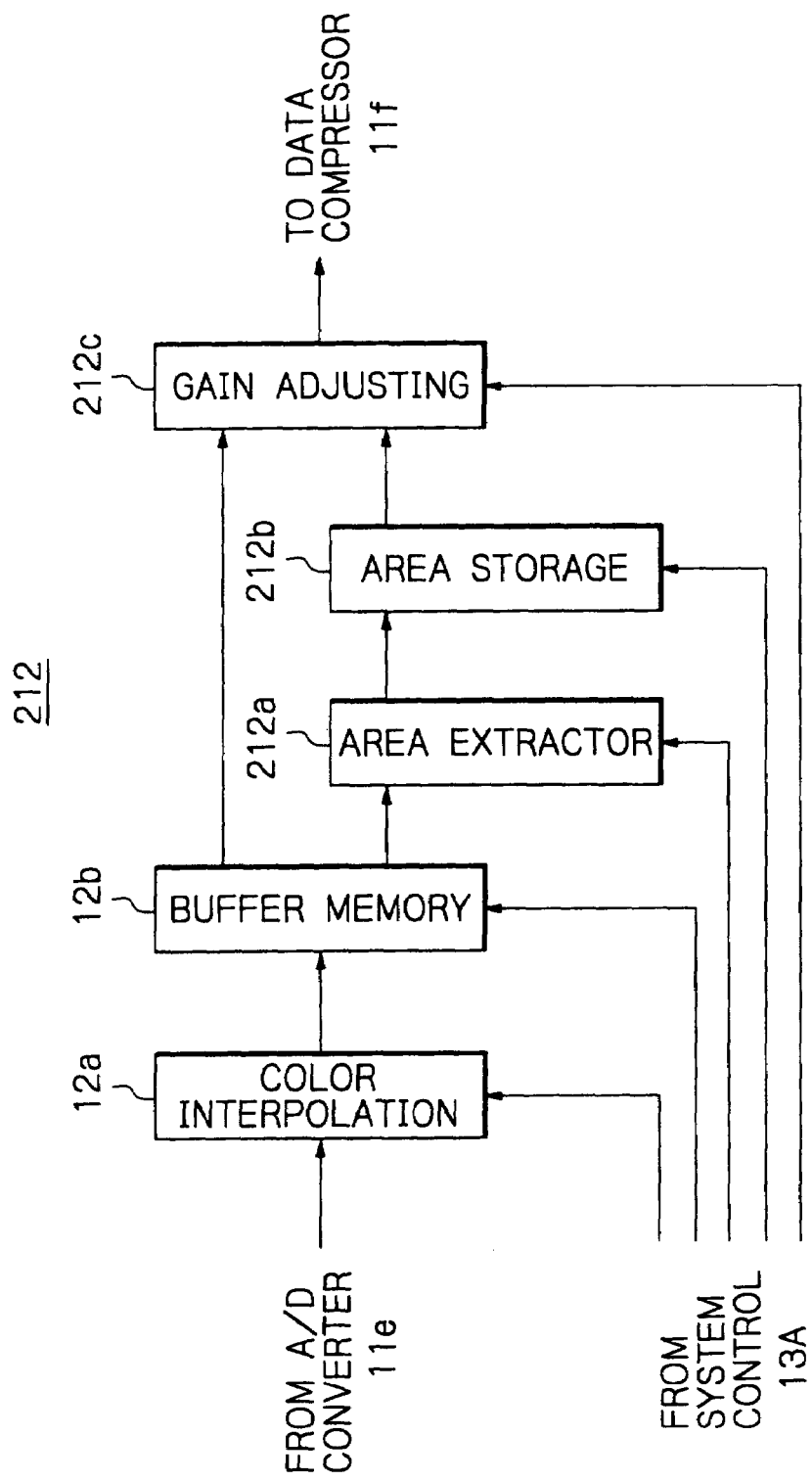

IMAGE SIGNAL PROCESSOR FOR PERFORMING IMAGE PROCESSING APPROPRIATE FOR AN OUTPUT DEVICE AND METHOD THEREFOR

BACKGROUND OF THE INVENTION

1. Field of the Invention

The present invention relates to an image signal processor for processing image signals obtained by imaging a subject field with an imaging device, and a method of processing the image signals.

2. Description of the Background Art

Some conventional cameras using silver-halide photosensitive films or digital still cameras have a function, so-called auto-bracketing, that continuously photographs a sequence of frames while gradually shifting the exposure to the underexposure side or overexposure side around the standard exposure of the camera.

A camera using silver-halide photosensitive films which performs auto-bracketing is disclosed in Japanese Patent Laid-Open Publication No. 249534/1993. This camera can decide the parameters, such as the number of frames to be photographed and the exposure correction amount, without receiving instructions from the user.

A camera that performs auto-bracketing according to the prior art photographs a plurality of frames, meaning that the photographed images differ in time. For example, when seven frames are photographed at 0.2-second intervals each at one of seven exposure levels, there is a 1.2-second difference in time between the first frame and the last frame. Therefore, the movement of the object, the change in the photographing conditions, the unintentional movement of the hands of the user in shooting the object, and the like during the shooting period of time make it difficult to appropriately photograph a desired image.

SUMMARY OF THE INVENTION

The present invention seeks to solve the problems associated with the prior art described above. It is therefore an object of the present invention to provide an image signal processor, and also a method of processing an image signal, that allows the user to obtain a desired image during auto-bracketing.

It is a specific object of the present invention to provide an image signal processor that generates a plurality of images which are different from each other in color balance, sharpness, gradation characteristics and the like, which would not be achieved only by changing the exposure amount.

To solve the above problems, an image signal processor for performing image processing on a first image signal representative of an image of a subject field captured by an imaging device to produce a second image signal comprises: a first memory for storing therein the first image signal; a plurality of image processors for each performing image processing, different from each other, on the stored first image signal to produce the second image signal different from each other; and a second memory for storing therein the second image signals produced, wherein said plurality of image processors include types and parameters of the image processing such that at least one of the types and parameters of the image processing are different between said plurality of image processors.

Advantageously, the types of image processing performed by said plurality of image processors may include at least one selected from a group consisting of a change of brightness, a change of gradation change characteristics, a correction of a color temperature, a change of saturation, a change of a contour, a change of a compression ratio and a change of a black level of the first image signal stored in said first memory, the parameters of image processing being of the at least one selected from the group, said plurality of image processors performing the image processing of the at least one selected from the group on the first image signal stored in said first memory according to the parameters of image processing.

In addition, in accordance with an aspect of the invention, each of said plurality of image processors may correspond to one of a plurality of display units which are provided for visualizing the image represented by the second image signals stored in said second memory, each of said plurality of image processors processing, according to the parameters, the second image signals to be displayed on one of the display units which corresponds to said image processor.

In a further aspect of the invention, the image signal processor may further comprise a divider circuit for dividing the first image signal stored in said first memory into a highlight area and a shadow area, each of said plurality of image processors performing the image processing in which at least one of the types and the parameters of the image processing differs between the highlight area and the shadow area.

Further in accordance with the present invention, an image signal processor for performing image processing on a first image signal representative of an image of a subject field captured by an imaging device to produce a second image signal, comprises: a first memory for storing therein the first image signal; a plurality of image processors for each performing image processing, different from each other, on the stored first image signal to produce a third image signal different from each other; a second memory for storing therein the third image signals produced, and an image composer circuit for composing the third image signals to produce the second image signal, wherein said plurality of image processors include types and parameters of the image processing such that at least one of the types and parameters of the image processing are different between said plurality of image processors.

Still further in accordance with the present invention, a method of processing a first image signal representative of an image of a subject field captured by an imaging device to produce a second image signal comprises the steps of: storing the first image signal in a memory; performing the same type of image processing on the stored first image signal according to parameters of image processing different from each other to produce the second image signals; and storing the produced second image signals in a memory.

BRIEF DESCRIPTION OF THE DRAWINGS

The objects and features of the present invention will become more apparent from consideration of the following detailed description taken in conjunction with the accompanying drawings in which:

FIG. 4 is a schematic block diagram showing an example of the usage-specific image processor of the signal processor of FIG. 2;

FIG. 6 is a schematic block diagram, like FIG. 1, showing an alternative embodiment of an electronic still camera to which the present invention is applied;

FIG. 7 is a schematic block diagram, similar to FIG. 2, showing an exemplified outline configuration of the signal processor of FIG. 6;

DESCRIPTION OF THE PREFERRED EMBODIMENTS

Referring to the accompanying drawings, preferred embodiments of an image signal processor according to the present invention will be described in detail. The image signal processor according to the present invention is adapted to store a frame of image data formed by an imaging device into a buffer memory, set up control values of image signal processing (image parameter information) on various situations for the frame of image data thus stored, and process the image signal for each of those situations to generate and store a plurality of frames of image data in a storage. This processor therefore allows various images, which meet various purposes, to be formed from one frame of photographed image data.

The image signal processor according to the present invention may be applied to a digital camera. In this specification, a digital camera refers to a photographing device, such as an electronic still camera and a digital video camera, which photographs still images or movie images for recording them in the form of digital signals.

The specific embodiments of the present invention described are a digital camera which has a single-plate color filter provided immediately in front of, or on, the photosensitive array and, especially, an electronic still camera. Referring to FIGS. 1-12, the configuration and the operation of the electronic still camera according to the present invention will be described.

An electronic still camera in a preferred embodiment of the present invention can achieve a purpose similar to auto-bracketing according to the prior art by simply photographing an object only once. The embodiment of the electronic still camera can also perform image processing to generate a plurality of different frames of image data that could not be done by changing the exposure amount only.

In addition, the electronic still camera in the illustrative embodiment is adapted to generate image signals in compliance with various types of image output system, more specifically a display unit, such as a CRT (Cathode-Ray Tube), or a printer, by which photographed image signals are to be visualized in the form of pictures. In the description below, processing for generating image signals compliance with a type of output system is called "usage-specific image processing."

In the illustrative embodiment, usage-specific image processing is performed on each of a plurality of frames of image data generated by image processing that is performed by changing image processing parameters. This processing, which includes processing corresponding to the auto-bracketing function according to the prior art, is called "gain adjustment." It should be noted that gain adjustment and usage-specific image processing are independent of each other. One of them may be executed independently.

Figure 1:
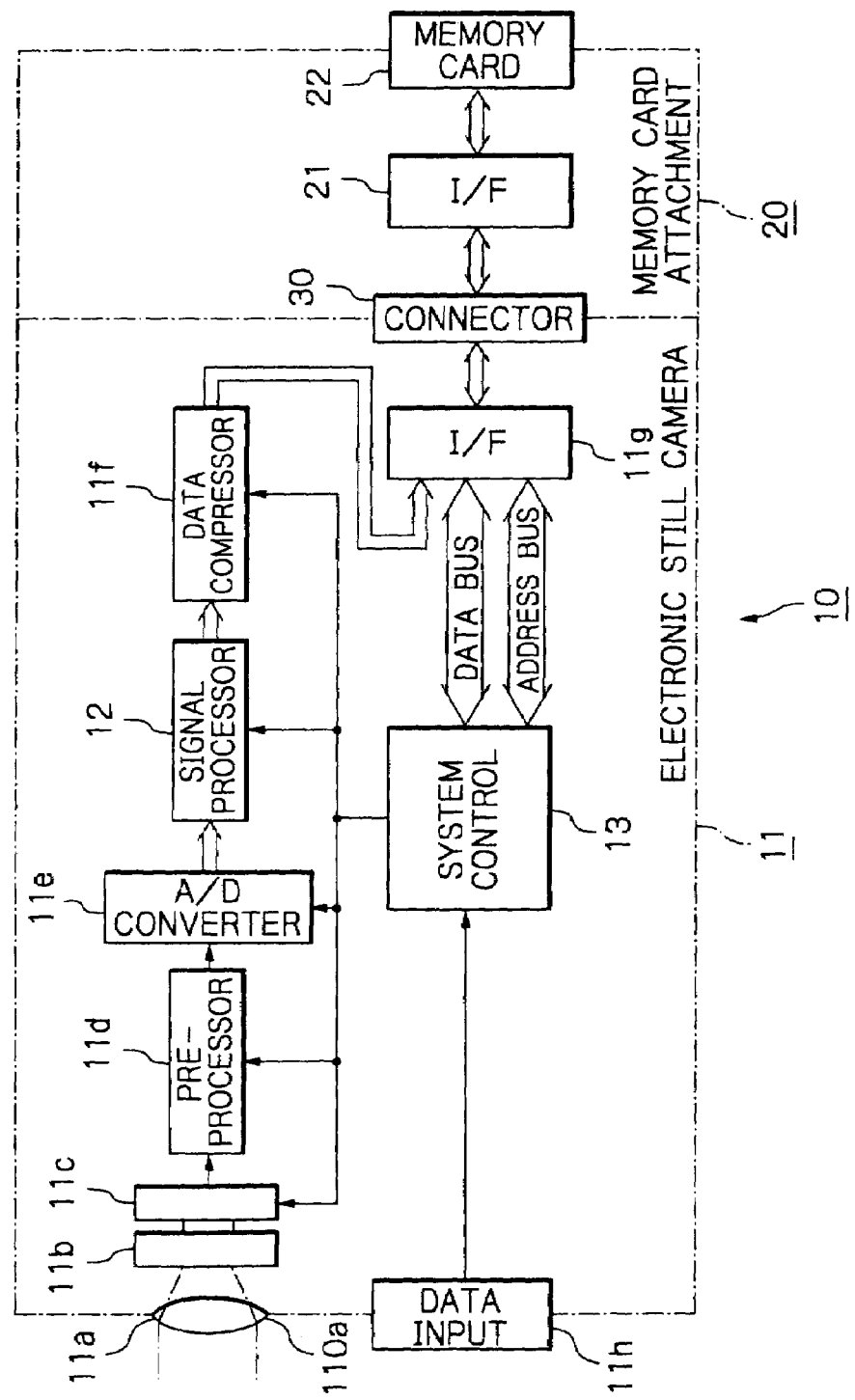
FIG. 1 is a schematic block diagram showing a preferred embodiment of an electronic still camera to which the present invention is applied.

As shown in FIG. 1, an electronic still camera 10 in the illustrative embodiment comprises a camera proper 11 and a detachable memory card attachment 20 connected together via a connector 30. The camera proper 11 comprises an optical system 11a, a color filter 11b, a CCD (Charge-Coupled Device) image sensor 11c, a preprocessor 11d, an analog-to-digital (A/D) converter 11e, a signal processor 12, a data compressor 11f, an input/output interface 11g, a data input unit 11h, and a system controller 13, which are interconnected as shown. The memory card attachment 20 comprises an input/output interface 21 and a memory card 22, interconnected as shown.

The optical system 11a comprises a photographing lens 110a, an iris and components associated therewith, not shown in the figure. The color filter 11b is a single-plate including color filter segments formed in a filter array as described above. The electronic still camera 10 specifically includes a Bayer color filter in the embodiment. The invention is not restricted to that specific filter array but applicable to other types of color filter arrays. In the description below, three primary colors are represented by R (red), G (green) and B (blue). The present invention may be applied regardless of the color filter arrangement type. This color filter array 11b is provided immediately before or on the photosensitive array of the CCD image sensor 11c.

On the CCD image sensor 11c, the photosensitive cells, or photodiodes, of the CCD image sensor 11c corresponding in position to the filter segments of the color filter 11b are provided to form an array of pixels. When incident light from the subject field falls on those cells, the cells photoelectrically convert the incident light into electric charges. The CCD image sensor 11c outputs those charges in the form of image signal, corresponding to the pixels, to the preprocessor 11d.

The preprocessor 11d is adapted to amplify the supplied image signal to a desired level and outputs the amplified signal to the A/D converter 11e. The A/D converter 11e is adapted to convert the analog signal, output from the preprocessor 11d, to the digital signal.

Figure 2:
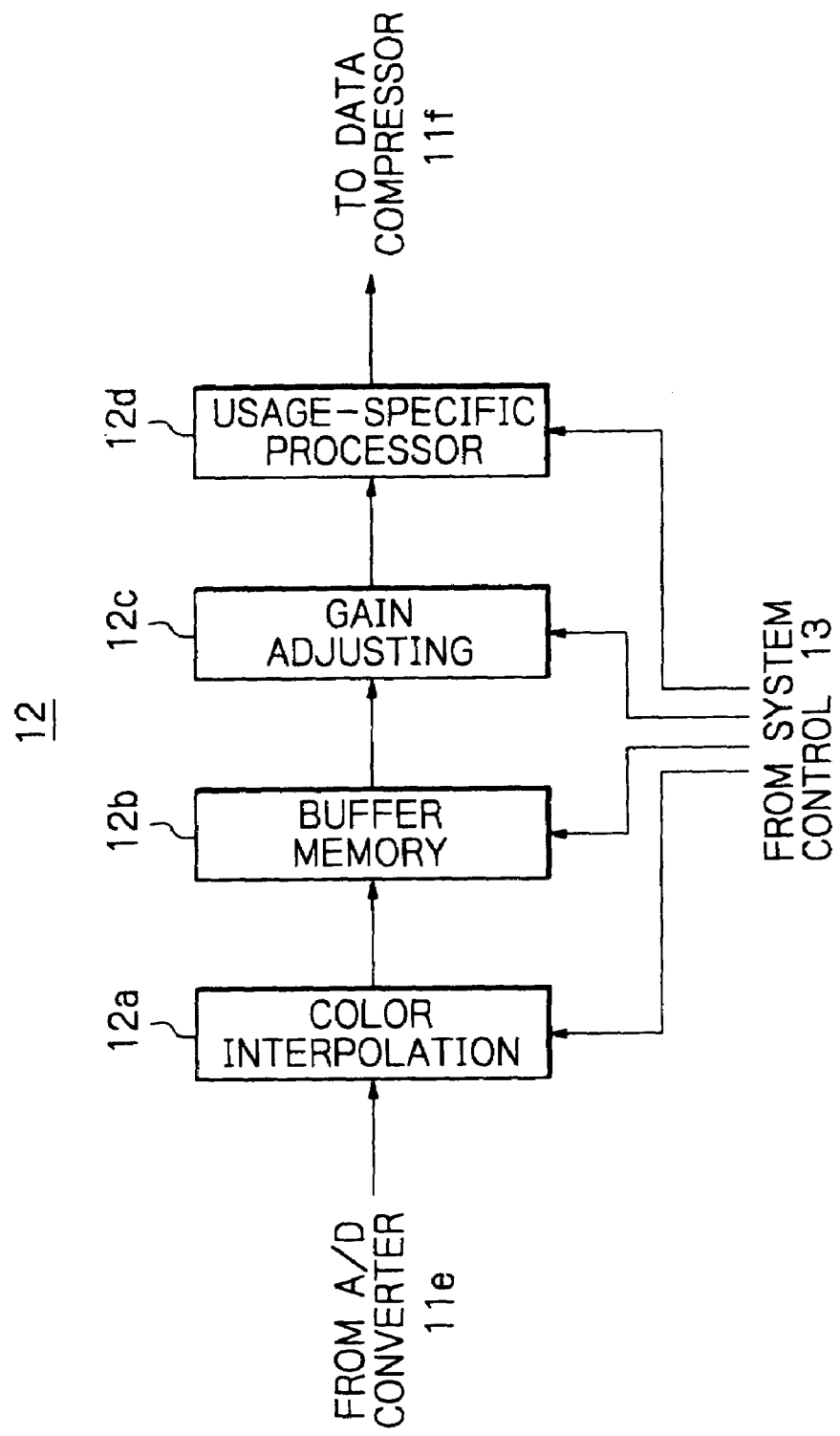
FIG. 2 is a schematic block diagram showing an exemplified outline configuration of the signal processor of FIG. 1.

The signal processor 12 is adapted for performing color correction on the digital signal thus received, storing the color-corrected digital signal temporarily into the buffer memory 12b, FIG. 2, and performing the image processing, such as gain adjusting and usage-specific image processing, on the stored digital signal to generate a plurality of frames of image data. The signal processor 12 may comprise a special-purpose IC (Integrated Circuit), a general-purpose CPU (Central Processor Unit) or microprocessor, or a DSP (Digital Signal Processor). It should be noted that the IC, CPU, or DSP may comprise not only the signal processor 12 but also the function of the data compressor 11f which will be described later.

The signal processor 12, which is one entity, has a plurality of image processing features to perform various types of processing on the image signal obtained from the image sensor 11c and stored to generate processed image signals which are different from each other. The signal processor 12 performs a plurality of types of image processing where at least one of the image processing types and image processing parameters is different from others. A plurality of signal processors, each corresponding to one of the plurality of image processing features, may be provided.

As shown in FIG. 2, the signal processor 12 comprises a color interpolation circuit (RGB interpolation circuit) 12a, a buffer memory 12b, a gain adjusting circuit 12c, and a usage-specific processor 12d. The color interpolation circuit 12a, buffer memory 12b, gain adjusting circuit 12c, and usage-specific processor 12d perform processing in response to the control signal from the system controller 13. The control signal contains the timing signal, as well as instructions and data required for processing.

The color interpolation circuit 12a is adapted to generate color data not obtainable directly by the actual photosensitive cells included in the CCD image sensor 11c, by interpolating the color data of the surrounding, actual cells. Thus, at each time of photographing, the color interpolation circuit 12a outputs the R data, G data, and B data at the respective pixel positions to store them into the buffer memory 12b.

The buffer memory 12b is adapted to store therein image data supplied from the color interpolation circuit 12a. The memory is large enough, for example, to contain one frame of image data. Image data is input to, and output from, the buffer memory 12b in response to an instruction from the system controller 13. Image data is stored in the buffer memory 12b each time an image of the object is photographed. In response to each instruction from the system controller 13, one frame of image data is output repeatedly from the buffer memory 12b to the gain adjusting circuit 12c.

The gain adjusting circuit 12c is adapted to perform gain adjustment on the image data read out from the buffer memory 12b. More specifically, in response to the instruction received from the system controller 13 and indicating how many times gain adjustment is to be executed and the exposure correction amount (parameter information), the gain adjusting circuit 12c multiplies the exposure value of image data from the buffer memory 12b by a predetermined value.

For example, when five frames of image data are to be generated during gain adjusting and when the exposure correction amount is to be incremented in steps of 0.5 EV (Exposure Value), the system controller 13 issues the instruction described below. The system controller 13 sequentially generates the pixel addresses included in one frame of image data and sends them to the buffer memory 12b. The system controller 13 repeats this processing five times. At the same time, the system controller 13 sends exposure correction values, e.g. −1.0, −0.5, 0.0, +0.5, and +1.0, to correct the exposure value (EV) each time it sends one frame of image data to the memory buffer. For example, the value −1.0 means that −1.0 EV of exposure correction will be executed. In response to this instruction, the gain adjusting circuit 12c performs processing associated with this exposure correction. More specifically, it multiplies the exposure value of the image data from the buffer memory 12b by a value ½. The values of −1.0, −0.5, 0.0, +0.5, and +1.0 mean that the gain adjusting circuit 12c will multiply the exposure value of the image data by values ½, $½^{1/2}$, 1.0, $2^{1/2}$, and 2, respectively. It should be noted that those numeric values are examples only but that exposure correction values are not limited to those specific values.

The usage-specific processor 12d is adapted to receive image data from the gain adjusting circuit 12c and perform image processing according to the information (parameter information) concerning a display unit specified by the system controller 13. Image data processing may be appropriate for two types, for example, one for CRT (Cathode Ray Tube) display and the other for printer output (hardcopy) of data, each having its own image quality. In the description below, those two types of processing are called CRT processing and hardcopy processing, respectively. The two types of processing will be described later in detail. The usage-specific processor 12d is also adapted to convert RGB data into luminance data Y and color difference or chrominance data B−Y and R−Y. Although only one processing setting is shown for each of CRT processing and hardcopy processing in the description of the embodiment, the present invention is not limited to the one setting. Two or more settings may be specified depending upon the type of the CRT or the printer. The present invention may also be applied to display systems other than the CRT, such as a liquid crystal display, an EL (Electro-Luminescence) display, and a plasma display.

The signal processor 12 outputs the luminance data Y and the color difference data B−Y and R−Y to the data compressor 11f shown in FIG. 1. The data compressor 11f is adapted to compress the luminance data Y and the color difference data B−Y and R−Y by reducing the number of bits of the data using Huffman coding or differential PCM as the compression method.

The data compressor 11f uses one of these compression methods to reduce the data amount and then outputs the reduced data to the input/output interface 11g.

The data compressor 11f can compress image data using the compression ratio in accordance with the display systems specified by the system controller 13. The compressor uses a higher compression ratio for image data to which the image quality for CRT display was assigned by the usage-specific processor 12d, and a lower compression ratio for image data to which the image quality for printer output was assigned. The processing of the data compressor 11f will be described later in detail.

The CCD image sensor 11c, preprocessor 11d, A/D converter 11e, signal processor 12, and data compressor 11f are timed with each other in response to the timing signal output from the system controller 13. The system controller 13 contains a system controller for controlling the constituent elements included in the whole electronic still camera 10, a timing signal generator for generating the timing signal, and an address controller, not shown in the figure. The system controller 13 also controls the timing signal generator and the address controller to control the whole electronic still camera 10. The timing signal generator, under the control of the system controller 13, generates the signals which are used for driving the whole electronic still camera 10 and adjusting the operational timing, and supplies those signals to the components as shown in FIG. 1.

The address controller outputs address data to the buffer memory 12b to sequentially input image data to, and output image data from, the buffer memory 12b. In addition, to store processed image data into the memory card 22, the system controller 13 outputs required data and addresses to the memory card 22 via the input/output interface 11g and the connector 30 of the camera proper 11 and via the input/output interface 21 of the memory card attachment 20. The required data includes a file name necessary for image data input/output, a photographing date and time, a photographing condition (exposure value), and an image processing condition (gain adjusting condition, display system information).

The data input unit 11h includes components for user operation such as a mode selector button, a shutter release button, and a liquid crystal monitor, not shown, on which the mode of the electronic still camera 10 is displayed. When the user operates the mode selector button or the shutter release button, the data input unit 11h outputs operational result data to the system controller 13.

User instructions entered by the mode selector button include whether to adjust the gain, whether to allow, if the gain is to be adjusted, the camera 10 to automatically decide the number of frames to be shot and the exposure correction amount, the number of frames to be shot and the exposure correction amount if manually decided by the user, and whether to perform usage-specific image processing.

In response to an instruction indicating that, during gain adjusting, the electronic still camera 10 will automatically decide the number of frames and the exposure correction amount, the system controller 13 may decide the proper exposure value, the number of frames, and exposure correction amount according to the method disclosed in Japanese Patent Laid-Open Publication No. 249534/1993.

The signal processor 12, adapted for processing digital signals, may be implemented in the form of dedicated digital signal processing IC. Because the primary operational function of the processor is multiplication and addition, a general-purpose DSP (Digital Signal Processor) may also be applicable.

Figure 3:
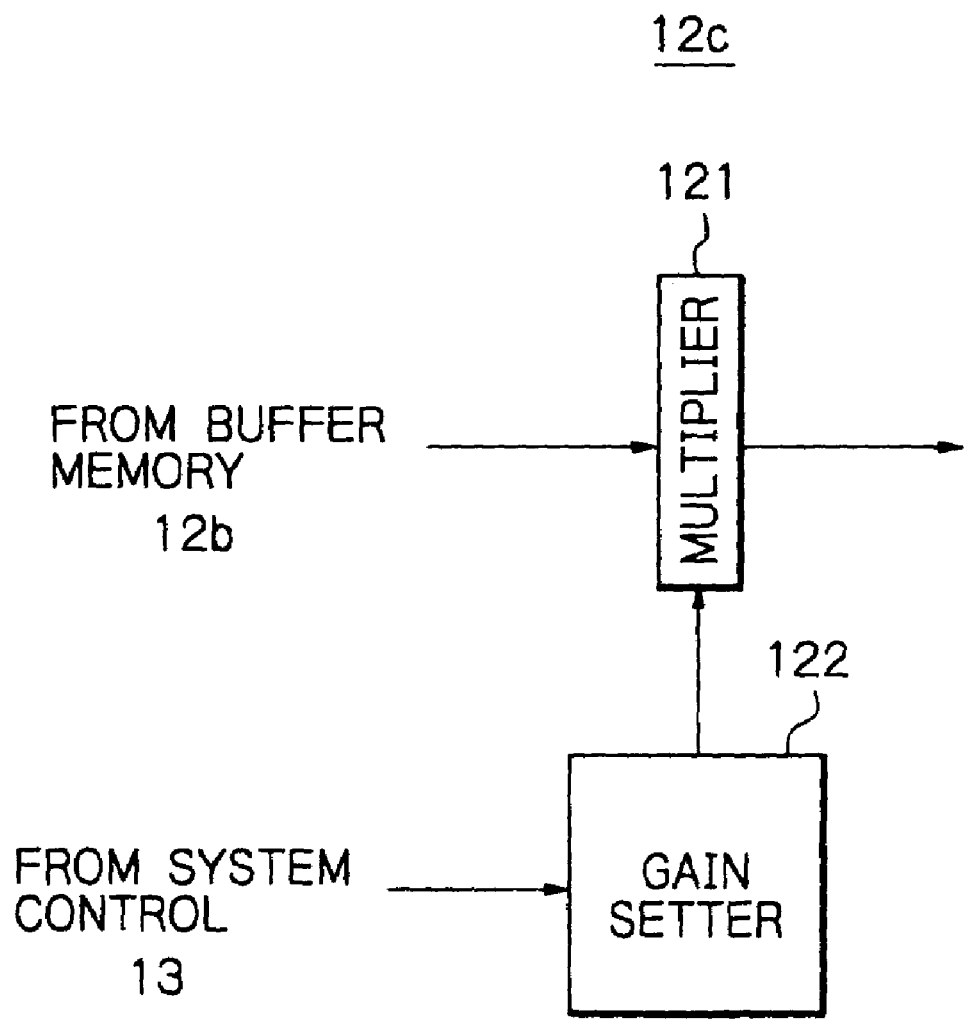
FIG. 3 is a schematic block diagram showing an example of the gain adjusting circuit of the signal processor of FIG. 2.

Next, referring to FIGS. 3 and 4 showing the detailed configurations of the gain adjusting circuit 12c and the usage-specific processor 12d, respectively, the signal processor 12 with the components described above will be described more in detail. As shown in FIG. 3, the gain adjusting circuit 12c comprises a multiplier 121 and a gain setter 122. The multiplier 121 is connected to receive image data from the buffer memory 12b. It is assumed that image data is sent from the buffer memory 12b to the gain adjusting circuit 12c in the raster scanning fashion. That is, after one line of pixel data is output horizontally, image data on the next line is output. One pixel of data, containing 24 bits in length (8 bits for each of R, G, and B), is sent over eight signal lines, i.e. eight bits in parallel.

The gain setter 122 is connected to receive an exposure correction amount instruction from the system control 13. For example, when the instruction indicating the value of "−1.0" is received from the system control 13, the gain setter 122 then sets the gain of the multiplier 121 to ½. Then, the multiplier 121 multiples multiplies the exposure value of the received image data by ½ and outputs the result to the gain adjusting circuit 12c. When no gain adjusting is performed, the system controller 13 sends the instruction indicating the value of "0.0" to the gain setter 122. This instruction means that image data from the buffer memory 12b is sent to the usage-specific processor 12d without making any change in the gain adjusting circuit 12c.

FIG. 4 shows the usage-specific processor 12d which is connected to receive image data from the gain adjusting circuit 12c. The usage-specific processor 12d comprises a selector 123, a gain control 124, a gradation control 125 comprising LUTs (Look Up Tables), a luminance-chrominance matrix 126, an edge or contour enhancement circuit 127, a saturation emphasizing circuit 128, and a parameter setter 129, interconnected as shown in the figure.

The selector 123 distributes RGB data, received sequentially from the gain adjusting circuit 12c, into R data, G data, and B data. This distribution allows processing for each color to be executed independently if necessary.

The gain control 124 amplifies each color data distributed by the selector 123. More specifically, the gain control 124 multiples color data by a numeric value predetermined for the display system (CRT or hardcopy).

Figure 5A:
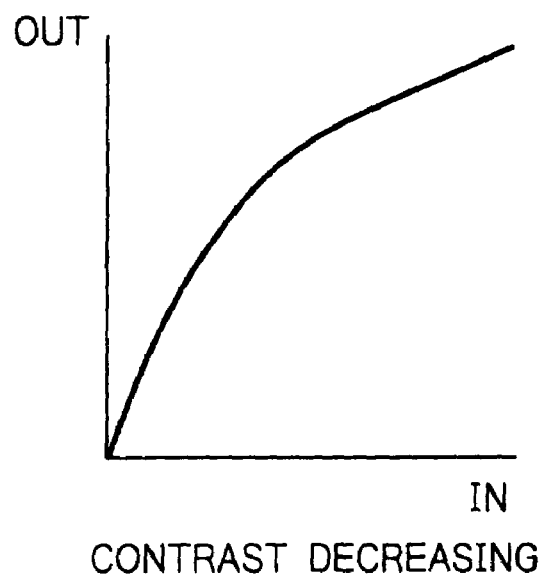
FIGS. 5A and 5B plot two types of processing performed by the gradation correction of FIG. 4.
Figure 5B:
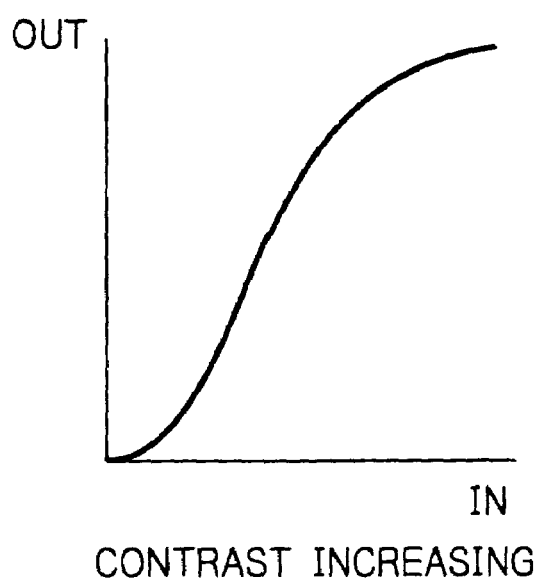

The gradation control 125 performs gradation conversion, that is, processing such as gamma correction. More specifically, the gradation control 125 includes a gradation correction curve defining the correspondence of the value of color data to be output with respect to the value of received color data, and converts the received color data according to the correction curve. FIGS. 5A and 5B show some examples of gradation correction curves. FIGS. 5A and 5B show the gradation correction curves to be used for CRT processing and hardcopy processing, respectively. In FIGS. 5A and 5B, the horizontal axis indicates the value of entered color data, and the vertical axis indicates the output value of color data corresponding to the received color data.

These curves are employed for the reasons described below. The correction curve in FIG. 5A is used for a CRT because the photoelectric conversion characteristics of the CRT screen is usually 2.2th power of the input so that conversion using 0.45th power of the input (0.45 is the reciprocal of 2.2) is performed. Using this correction curve makes the contrast relatively lower than the contrast before gradation correction. Therefore, this type of correction is called "contrast decreasing".

The gradation correction curve in FIG. 5B is used for a hardcopy because the S-shaped characteristics are desirable when restoring the contrast of image data on a hardcopy. That is, since it is usually important to retain definite contrast, or intensity difference, on a hardcopy, a sharper contrast is desired. The intermediate portion of the S-shaped curve has a slope corresponding to gamma=1. This portion corresponds to the flesh color, and gamma=1 is desirable for the flesh color. Using this correction curve makes the contrast relatively higher than the contrast before corrected in gradation. Therefore, this type of gradation correction is called "contrast increasing".

It is also possible for the gain control 124 and the gradation control 127 to use a gain and a gamma correction curve which are different in dependent upon colors of image data.

The luminance-chrominance matrix 126 is adapted to perform matrix operation to convert RGB data to the luminance signal (Y) and color difference signal (Cr, Cb). The matrix operation is performed using the expressions read below.

$$Y1 = K11 \times R1 + K12 \times G1 + K13 \times B1,$$

$$Cr1 = K21 \times R1 + K22 \times G1 + K23 \times B1,$$

$$Cb1 = K31 \times R1 + K32 \times G1 + K33 \times B1, \quad (1)$$

where, R1, G1, and B1 are color data that is input to the luminance-chrominance matrix 126. They represent the red green and blue components, respectively. K11, K12, K13, K21, K22, K23, K31, K32, and K33 are correct coefficients. Y1 is the luminance signal that is output by the luminance-chrominance matrix 126. Cr1 and Cb1 are color difference signals output by the luminance-chrominance matrix 126. The luminance signal Y1 is sent to the edge enhancing circuit 127, and the color difference signals Cr1 and Cb1 are sent to the saturation emphasizing circuit 128.

The edge enhancing circuit 127 emphasizes the edge or contour of image data (aperture) to increase the contrast of the whole image. A known method may be used for emphasizing the contour of a picture. For example, to emphasize a horizontal contour line, the method described below is performed. The original signal Y0 is delayed by one horizontal scan period of time 1H into a 1H-delayed signal YH, and by two horizontal scan periods of time 2H into a 2H-delayed signal Y2H. In this case, YH+K×[YH−(Y0+Y2H)/2] is the luminance signal in which the horizontal contour line is emphasized, where K is a constant defining the degree of emphasizing the contour line. The larger the value K, the more emphasized the contour. This processing may be performed by a low-pass filter (LPF).

A similar known method may be used for emphasizing a vertical contour line. The original signal Y0 is delayed by the predetermined delay time 1τ into a delayed signal, and by two times of the delay time, i.e. 2τ into a delayed signal Y2τ. In this case, Yτ+K×[Yτ−(Y0+Y2τ)/2] is the luminance signal in which the vertical contour line is emphasized, The saturation emphasizing circuit 128 is adapted to modify the color difference signal to convert saturation. More specifically, the circuit 128 multiplies a numeric value predetermined according to the display system by the color difference signal. More specifically, the saturation is represented by $(Cr2+Cb2)^{1/2}$. To emphasize the saturation, the circuit 128 multiples-multiplies the color difference signals, Cr and Cb, by a predetermined numeric value. The same predetermined value, or different predetermined values, may be used for the color difference signal Cr and the color difference signal Cb. The predetermined numeric value should be decided considering the hue.

Table 1 shows in the column of usage-specific image processing how the gain control 124, gradation control (LUTs) 125, luminance-chrominance matrix 126, edge enhancing circuit 127, and saturation emphasizing circuit 128 convert image data for the specific display systems during the CRT processing and the hardcopy processing described above.

TABLE 1

|  | Usage-specific image processing | |
| --- | --- | --- |
|  | CRT processing | Hardcopy processing |
| Gain | Large | Small |
| LUT | A | B |
| Matrix coefficient | Change | Change |
| Contour enhancing | Strong | Weak |
| Saturation emphasis | Strong | Weak |
| Compression ratio | High | Low |

The row Gain in Table 1 represents the gain control of the gain control 124, and the row LUT represents the gradation correction of the gradation control 125. Note that the letter "A" in this row indicates the gradation correction curve plotted in FIG. 5A and that "B" indicates the correction curve shown in FIG. 5B. The row Matrix coefficient represents the conversion of the luminance-chrominance matrix 126, and the rows Contour enhancing and the Saturation emphasis represent the conversion of the edge enhancing circuit 127 and the saturation emphasizing circuit 128. The row Compression ratio represents the conversion of the data compressor 11f shown in FIG. 1.

The reason for the settings shown in Table 1 will be described. In general, when comparing the color range which a CRT can represent with the color range which a hardcopy (especially a printer) can represent, the color range which the CRT can represent is wider. On a CRT, a brighter image looks clearer. On a hardcopy, a darker image looks clearer.

For that reason, on a CRT the gain and the saturation emphasis are increased whereas on a hard copy the gain and the saturation emphasis are decreased. Also, the contour enhancement is increased on a CRT because a contour-enhanced, sharp image is desirable. On the other hand, the contour enhancement is decreased on a hardcopy because a soft image is desirable. The reason for the LUT setting was described with reference to the gradation control 125. The compression ratio will be descried later.

In response to the signal indicating the type of display system from the system controller 13, the parameter setter 129 shown in FIG. 4 sets the value in the components of the usage-specific processor 12d according to the setting shown in Table 1. More specifically, for the gain control 124, the parameter setter 129 has two types of coefficients (corresponding to the gains of the amplifier) for two types of display systems. In response to the instruction from the system control 13, the parameter setter 129 outputs one of two types of coefficients to the gain control 124. The gain control 124 multiplies color data by the coefficients.

The parameter setter 129 performs the same setting for the saturation emphasizing circuit 128.

To the gradation control 125, the parameter setter 129 outputs the signal which specifies a gradation correction curve. The setter 129 also outputs the above-described coefficients, which specify to which extent the contour is to be emphasized, to the edge enhancing circuit 127.

The image data, processed by the usage-specific processor 12d of the signal processor 12 as described above, is sent to the data compressor 11f shown in FIG. 1. In response to an instruction from the system controller 13 indicating whether to increase or decrease the compression ratio, the data compressor 11f compresses the received image data according to the instruction. The image data may be compressed, for example, based on the JPEG (Joint Photographic coding Experts Group) standard. In the JPEG standard, image data is compressed by sequentially performing DCT (Discrete Cosine Transform) processing, quantization, and coding (run length coding and Huffman coding). To change the compression ratio, the quantization table used for quantization should be changed. Specifically, two tables are prepared, one for higher compression and the other for lower compression. The image data is quantized using either of the two quantization tables in dependent upon the specified compression ratio.

The reason for setting the compression ratio, as shown in Table 1 in accordance with the display system, is that a higher compression ratio is selected for a wider range image data to be used for CRT processing whereas a lower compression ratio for a narrower range image data to be used for hardcopy processing. This setting allows one frame of image data to be stored in the same memory capacity.

The compressed image data is sent to the memory card 22 and stored therein. The memory card may be a semiconductor memory (flash memory, and the like), a magnetic disk, or an optical disc.

In operation, the user manipulates the data input unit 11h to specify whether to perform gain adjusting and usage-specific image processing. When the user wants to do gain adjusting, he or she must specify the number of image data frames to be created and the exposure correction amount. In response to the user instruction, the system controller 13 decides whether to perform gain adjusting and/or usage-specific image processing. When both gain adjusting and usage-specific image processing are to be performed, the system controller 13 causes the signal processor 12 to do its processing the number of times equal to two times of the number of processing cases during gain adjusting. In the description below, assume that the user has specified that both gain adjusting and usage-specific image processing are to be performed, that the number of processing cases during gain adjusting is three, and that the exposure correction amount is incremented in steps of 1 EV. In this case, six frames of image data will be finally obtained.

When the user depresses the shutter release button after specifying the processing mode setting, the imaging device 11*c* captures an image of a subject. The obtained image data is processed by the preprocessor 11*d* and the A/D converter 11*e* and then sent to the signal processor 12. The image data, for which color interpolation is performed by the color interpolation circuit 12*a* of the signal processor 12, is in turn stored in the buffer memory 12*b*. Each time an output instruction and an address are received from the system controller 13, the image data is sent from the buffer memory 12*b* to the gain adjusting circuit 12*c*. In response to the instruction from the system controller 13, the gain adjusting circuit 12*c* sequentially shifts the coefficients ½, 1.0, 2.0, ½, 1.0, 2.0, by which the image data is to be multiplied.

The image data for which gain-adjusting has been performed is sent to the usage-specific processor 12*d*. The usage-specific processor 12*d* performs CRT processing for the first three frames of image data, and hardcopy processing for the last three frames of image data, according to the settings in Table 1.

After usage-specific image processing, the first three frames of image data are compressed at a higher compression ratio, and the last three frames of image data at a lower compression ratio. Then, the compressed data is sent to the memory card, one frame of data at a time.

Unlike a camera that performs auto-bracketing according to the prior art, the electronic still camera according to the present invention photographs an image only once. Therefore, a problem that the photographing timing differs with photographed images does not arise. As a result, the user may obtain a desired image without concerning the movement of an object, changing image-shooting conditions, or unintentional movement of the operator's hands during photographing.

From the six processing options listed in Table 1, i.e. the gain, LUT, matrix coefficients, contour enhancement, saturation emphasis, and compression ratio, one to five processing methods may be selected and combined.

Next, an alternative embodiment of the present invention will be described. In this embodiment, white balance correction and brightness correction are made as gain adjusting in a plurality of ways. White balance correction is made by three adjustments, that is, gain adjustment, matrix coefficient adjustment, and saturation adjustment.

Gradation correction is performed for brightness correction. To do so, in this embodiment one frame of image is dealt with as two parts according to the amount of light: a bright part where light falls (highlight area) and a shadowy part where little or no light falls (shadow area). Different parameters are used for the highlight area and the shadow area. This processing will be described later in detail.

One or both of white balance correction and brightness correction may be made for one frame of image data. The user may specify how correction will be made.

In this embodiment, black level offsetting is also done. The black level refers to the status in which the gradation value is null. Black level offsetting refers to the increase or decrease of the gradation value of the whole image by a predetermined amount. The purpose of black level offsetting is to decrease the gradation value when the whole image looks too whitish due to a halation or to increase the gradation value to brighten the whole area of the image photographed at night.

Black level offsetting is done by adding or subtracting a predetermined value to or from the whole image data using an adder.

Black level offsetting may also be done in the first embodiment. In the first embodiment, an adder may be added before or after the multiplier of the gain adjusting circuit 12*c* to offset the black level.

The instant embodiment is similar to the first embodiment except for the configuration and the operation of the signal processor, system controller, and data input unit. The remaining components, i.e. the optical system 11*a*, color filter array 11*b*, CCD image sensor 11*c*, preprocessor 11*d*, A/D converter 11*e*, data compressor 11*f* and input/output interface 11*g* of the camera proper 11, and the input/output interface 21 and memory card 22 of the memory card attachment 20, perform the same processing as those of the first embodiment.

Therefore, the alternative embodiment will be described below with emphasis on the signal processor, system controller, and data input unit. The same reference numbers denote the components having the function similar to that in the first embodiment. The description of such components is omitted.

As shown in FIG. 6, an electronic still camera 10A in the alternative embodiment comprises a camera proper 11A and the memory card attachment 20 connected together via the connector 30. The camera proper 11A comprises the optical system 11*a*, the color filter array 11*b*, the CCD image sensor 11*c*, the preprocessor 11*d*, the A/D converter 11*e*, a signal processor 212, the data compressor 11*f*, the input/output interface 11*g*, a data input unit 11*h*A, and a system controller 13A. The memory card attachment 20 comprises the input/output interface 21 and the memory card 22.

The signal processor 212 makes color correction in response to the digital signal from the A/D converter 11*e*, temporarily stores the color-corrected digital signal into the buffer memory, and performs image processing (gain adjusting) on the stored digital signal to generate a plurality of frames of image data.

As shown in FIG. 7, the signal processor 212 comprises the color interpolation circuit 12*a*, the buffer memory 12*b*, an area extractor 212*a*, an area storage 212*b*, and a gain adjusting circuit 212*c*. The color interpolation circuit 12*a*, buffer memory 12*b*, area extractor 212*a*, area storage 212*b*, and gain adjusting circuit 212*c* are adapted to perform the processing in response to the control signal from the system controller 13A. The control signal contains the timing signal, as well as instructions and data required for processing that will be described later.

The buffer memory 12*b* stores therein image data supplied from the color interpolation circuit 12*a*. The memory 12*b* is large enough, for example, to contain one frame of image data. Image data is input to, and output from, the buffer memory 12*b* in response to an instruction from the system controller 13A. Image data is stored in the buffer memory 12b each time an image is photographed.

Figure 8A:
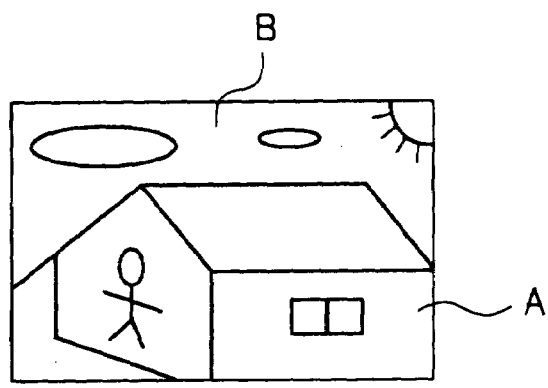
FIGS. 8A, 8B and 8C show examples of the areas extracted by the area extractor of FIG. 7.
Figure 8B:
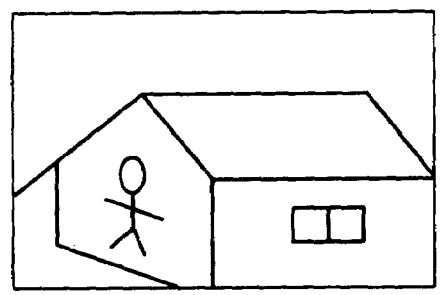

When brightness correction is made, one frame of image data is output first from the buffer memory 12b to the area extractor 212a in response to an instruction from the system control 13A. The area extractor 212a extracts the highlight area and the shadow area. This extraction will be described with reference to FIGS. 8A, 8B and 8C. FIG. 8A shows an image photographed outdoors on a fine day under the daylight against the sun or against a bright background. This photograph shows the highlight area and the shadow area most clearly.

Figure 8C:
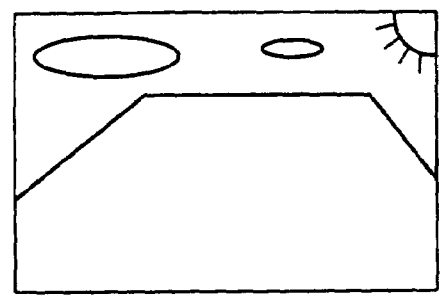

One frame of image shown in FIG. 8A comprises shadowy part (shadow area) A and highlight area B which is the fair sky, clouds, or a bright background. This image, where the shadow is dark, gives a sharp impression. By increasing the brightness of shadowy part A and decreasing the brightness of bright part B, the shadow is decreased and the image looks softer. To process an image whose brightness varies in dependent upon the parts of the image, the shadowy part shown in FIG. 8B and the bright part shown in FIG. 8C are extracted from the one frame of original image.

More specifically, a check is made, during extraction processing, for each pixel to see if it is a highlight or a shadow. The binary value "1" is output to the area storage 212b when the pixel is a highlight; the binary value "0" is output to the area storage 212b when the pixel is a shadow. In the description below, those values "1" and "0" are called area information. The area information is used by the gain adjusting circuit 212c to perform different processing for the highlight area and the shadow area.

The area storage 212b receives the area information from the area extractor 212a and stores therein the area information on the pixels included in one image. In response to an instruction from the system controller 13A, this information is sent to the gain adjusting circuit 212c.

To do brightness correction, the image data is sent from the buffer memory 12b to the gain adjusting circuit 212c after the area information is stored in the area storage 212b. The image data is sent each time an instruction is sent from the system controller 13A to the buffer memory 12b. The number of times the image data is sent equals the number of times white balance correction parameters are to be changed multiplied with the number of times brightness correction parameters are to be changed.

When only white balance correction is to be made, the area extractor 212a and the area storage 212b are not active.

The gain adjusting circuit 212c is adapted for receiving the image data from the buffer memory 12b, and adjust the gain of the received image data. More specifically, the gain adjusting circuit 212c processes the image data from the buffer memory 12b according to the instruction from the system controller 13A. This instruction indicates whether to make white balance correction, whether to make brightness correction, the number of times correction parameters are to be changed, or the parameter values (color temperature or exposure amount) to be used.

Assume that both white balance correction and brightness correction are to be made, that the white balance correction parameters are to be changed three times, and that the brightness correction parameters are to be changed twice. Then, the system controller 13A issues the instruction described below.

First, in order to create area information, the system controller 13A sequentially generates the addresses of the pixels included in one frame of image data and sends them to the buffer memory 12b. At the same time, the system controller 13A tells the area extractor 212a to receive image data from the buffer memory 12b to do the area extraction.

After the area extractor 212a performs the area extraction to store area information in the area storage, the system controller 13A sequentially generates the addresses of the pixels included in one frame of image data and sends them to the buffer memory 12b. The system controller 13A repeats this processing six (=3×2) times. At the same time, each time the system controller 13A performs this processing, it sends an instruction to the gain adjusting circuit 212c, indicating whether to make white balance correction and/or brightness correction as well as parameter information (color temperature and exposure amount) to be used during these corrections.

The gain adjusting circuit 212c also converts RGB data to luminance data Y and color difference data B-Y and R-Y. The gain adjusting circuit 212c outputs the luminance data Y and the color difference data B-Y and R-Y to the data compressor 11f shown in FIG. 6.

The gain adjusting circuit 212c is also adapted to receive from the system controller 13A an instruction indicating whether to perform the black level offsetting, and perform the black level offsetting accordingly. The instruction indicating whether to perform the black level offsetting is sent to the system controller 13A whenever the user presses the mode selector button which will be described later.

Upon receiving a black level offsetting instruction, the system controller 13A checks the pixels stored in the buffer memory 12b or the gradation values of the sampled pixels to determine whether or not the black level offsetting is to be performed. For example, when the number of black level pixels is smaller than a predetermined number and when the number of white level pixels is larger than a predetermined number, the system controller 13A determines that there is a halation in the image. Then, the system controller 13A tells the gain adjusting circuit 212c to decrease the gradation values of the pixels. Conversely, when the number of black level pixels is larger than a predetermined number, the system controller 13A determines that the whole screen is too dark, for example, because the image was photographed at night. Then the system controller 13A instructs the gain adjusting circuit 212c to increase the gradation values of the pixels.

When the system controller 13A receives a black level offsetting instruction, it may generate image data for which the black level offsetting is performed, as well as image data for which no black level offsetting is performed, at the same time.

The CCD image sensor 11c, preprocessor 11d, A/D converter 11e, signal processor 212, and data compressor 11f are timed with each other in response to the timing signal output from the system controller 13A. The system controller 13A contains a system controller for controlling the whole electronic still camera 10A, a timing signal generator for generating the timing signal, and an address controller, not shown in the figure. The system controller 13A also controls the timing signal generator and the address controller to control the whole electronic still camera 10A. The timing signal generator, under the control of the system controller, generates the signal driving the whole electronic still camera 10A and the operational timing adjusting signal and supplies these signals to the components as shown in FIG. 6.

To store processed image data into the memory card 22, the system controller 13A outputs required data and addresses to the memory card 22 via the input/output interface 11g and the connector 30 of the camera proper 11A and via the input/output interface 21 of the memory card attachment 20. The required data includes a file name necessary for image data input/output, a photographing date, a photographing condition (exposure value, etc.), and an image processing condition (gain adjusting condition).

The data input unit 11hA includes components for user operation such as a mode selector button, a shutter/release button, and a liquid crystal monitor on which the mode of the electronic still camera 10A is displayed, not shown in the figure. When the user manipulates the mode selector button or the shutter release button, the data input unit 11hA outputs operational result data to the system controller 13A.

User instructions entered by the mode selector button include whether to perform gain adjusting and, if gain adjusting is to be performed, whether to perform white balance correction and/or brightness correction. In addition, the number of times the parameters for each of white balance correction and brightness correction are to be changed may be specified. Whether to perform black level offsetting may also be specified.

When the system controller 13A receives, before gain adjusting, an instruction which allows the electronic still camera 10A to automatically decide the number of frames, the system controller 13A decides the number of frames that is set as the default value, for example, five frames for white balance correction and four frames for brightness correction.

In this embodiment, five types of parameters are provided for white balance correction, and four types for brightness correction. More specifically, five color temperature parameters are provided (corresponding to daytime light, morning and evening light, cloudy-day light, incandescent light, and fluorescent light).

There are four types of brightness correction. More specifically, the exposure values for the highlight area are 0.0, −0.5, −1.0, and −1.5 EV, and four exposure values for the shadow area are 0.0, +0.5, +1.0, and +1.5 EV. The exposure values for the highlight area, 0.0, −0.5, −1.0, and −1.5 EV, are combined with the exposure values for the shadow area, +1.5, +1.0, +0.5, and 0.0 EV. That is, the exposure value of −1.5 EV for the highlight area is combined, for example, with the exposure value of 0.0 EV for the shadow area. It is to be understood that the present invention is not limited to those specific combinations.

When the user specifies the number of frames, the parameters are selected automatically from the above-described five types and four types. For example, if the user selects three types for white balance correction and two types for brightness correction, then daytime light, cloudy-day light, and incandescent light are selected as the white balance parameters. As the brightness correction parameters, −0.5 and −1.0 EV are selected for the highlight area, and +1.0 and +0.5 EV for the shadow area.

The signal processor 212, adapted for processing digital signals, may be implemented in the form of a digital signal processing IC. Because the primary operational function of the processor 212 is multiplication and addition, a general-purpose DSP may also be used.

Next, the area extractor 212a and the gain adjusting circuit 212c of the signal processor 212, which has the components described above, will be described more in detail.

Figure 9:
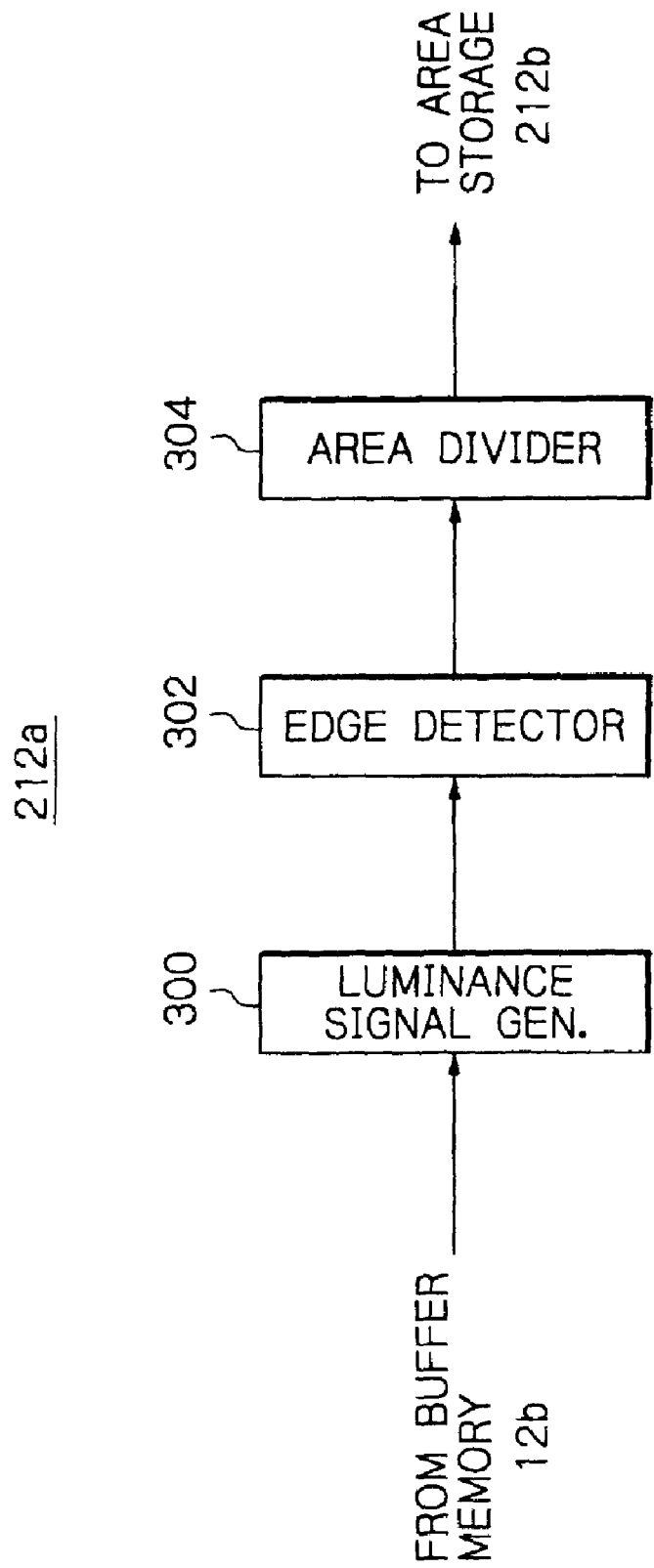
FIG. 9 is a schematic block diagram, similar to FIG. 7, showing an exemplified outline configuration of the area extractor of FIG. 7.

First, the area extractor 212a is adapted to find out the highlight areas and the shadow areas included in one frame of image and outputs area information indicating which area each pixel belongs to. There are many area extraction methods. The present invention is not limited to any particular area extraction method. In the description of the alternative embodiment, an application will be described in which the edge detection is combined with the area division. With such an application, the area extractor 212a comprises a luminance signal generator 300, an edge detector 302, and an area divider 304 interconnected as shown in FIG. 9.

The luminance signal generator 300 is adapted to generate the luminance signal Y of each pixel based on the color data (RGB data) received from the buffer memory 12b. The luminance signal Y and RGB data are related as indicated by expression (2) shown below. The luminance signal generator 300 generates the luminance signal Y based on this expression. The areas are extracted based on the obtained luminance signal Y.

$$Y = 0.30R + 0.59G + 0.11B \tag{2}$$

Areas are extracted in two stages. First, the edge detector 302 detects an edge. The edge detector 302 checks the luminance signal Y to detect a point at which the brightness of the image changes, and finds out a candidate for the boundary between the highlight and shadow areas.

More specifically, an edge in a boundary between the highlight and shadow regions is a step-type edge whose brightness changes gradually. One method of detecting a step-type edge is to find out the spatial, primary derivative, df(x,y), of the brightness signal, f(x,y), of each pixel. If the absolute value of the derivative is larger than a predetermined value, then the edge detector 302 determines that the pixel constitutes a step-type edge. The expression (x,y) represents the spatial (horizontal and vertical) position of a pixel in the coordinates. For example, when one frame of image data is composed of 488 horizontal lines each including 720 pixels, $1 \leq x \leq 720$ and $1 \leq y \leq 488$. The derivative df(x,y) is represented by the expression given below.

$$df(x,y) = (\partial f/\partial x) + (\partial f/\partial y) \tag{3}$$

The absolute value of the derivative is as shown below.

$$|df(x,y)| = [(\partial f/\partial x)^2 + (\partial f/\partial y)^2]^{1/2} \tag{3}$$

Figure 10:
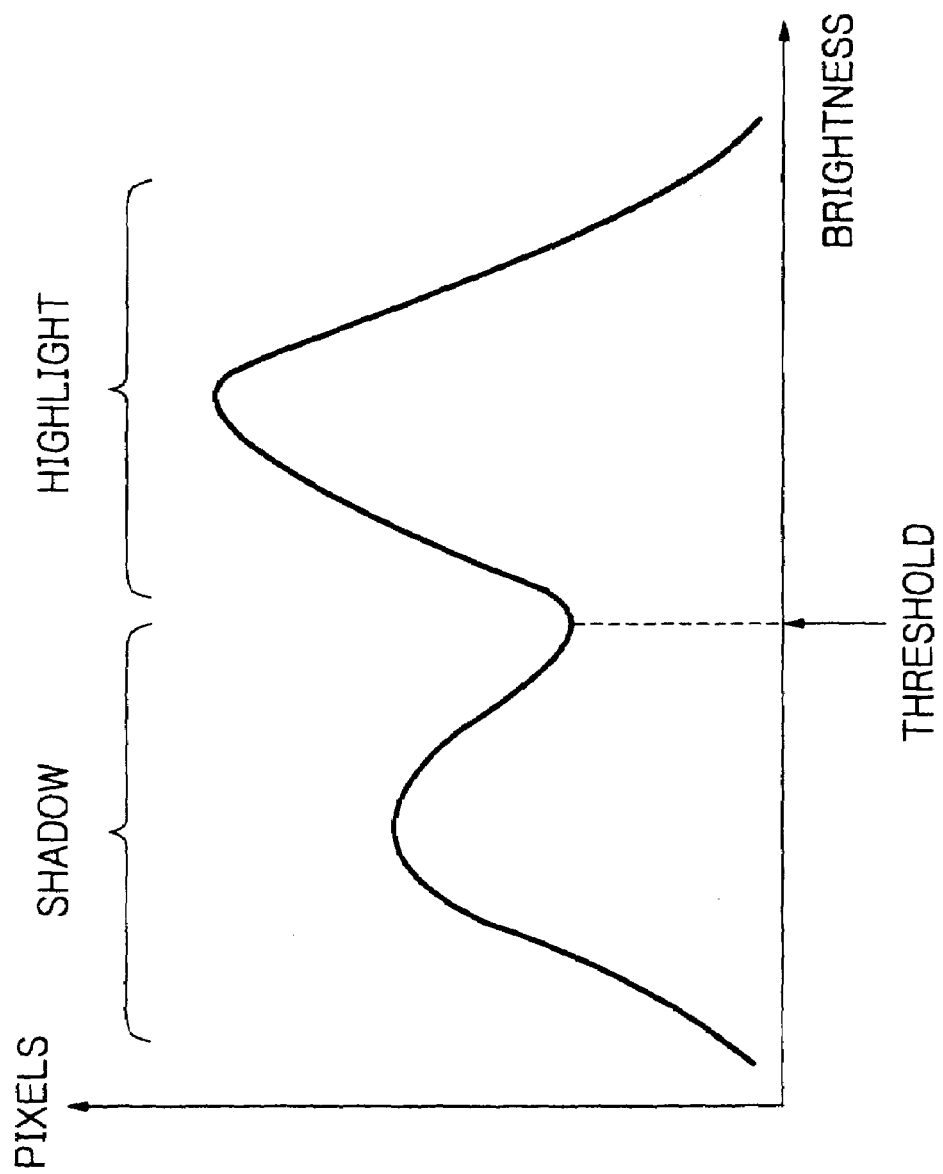
FIG. 10 is a histogram plotting pixels with respect to the brightness of a subjective field, useful for understanding how the area extractor of FIG. 7 divides an area.

Next, the area divider 304 determines the highlight area and the shadow area. More specifically, the area divider 304 divides the image according to the boundary candidate obtained by the edge detector 302 and, for each obtained area, finds out the number of pixels included in the area and the average of the brightness values of the pixels included in the area. With the number of pixels plotted on the vertical axis and the average of the brightness values of the pixels included in each area on the horizontal axis, the histogram shown in FIG. 10 is created. This histogram typically has two peaks, for example, when the image is photographed against the sun. The peak of the higher brightness part corresponds to the highlight area, and the peak of the lower brightness area to the shadow area.

By means of the trough between the two peaks as the threshold, the area divider 304 divides the whole area of the image into two. Specifically, one area whose brightness is higher than the threshold is defined as the highlight area, while the other area whose brightness is lower than the threshold is defined as the shadow area. After defining the areas as described above, the area extractor 212a outputs to the area storage 212b the binary value "1" for pixels included in the highlight area, and the binary value "0" for pixels included in the shadow area, in response to the address information supplied from the system controller 13A.

The area storage 212b retains this area information until the next image is photographed and new area information is written in. The retained area information is output to the gain adjusting circuit 212c in response to an output instruction and address information from the system controller 13A.

The gain adjusting circuit 212c receives this area information from the area storage 212b and image data from the buffer memory 12b. From the area storage 212b and the buffer memory 12b, the image data is sent to the gain adjusting circuit 212c in the raster scanning fashion. Specifically, one horizontal line of image data is output followed by the next one line of image data. One unit of image data from the buffer memory 12b includes 24 bits in length (8 bits for each R, G, and B data), and is sent in parallel over eight signal lines, i.e. eight bits at a time.

Figure 11:
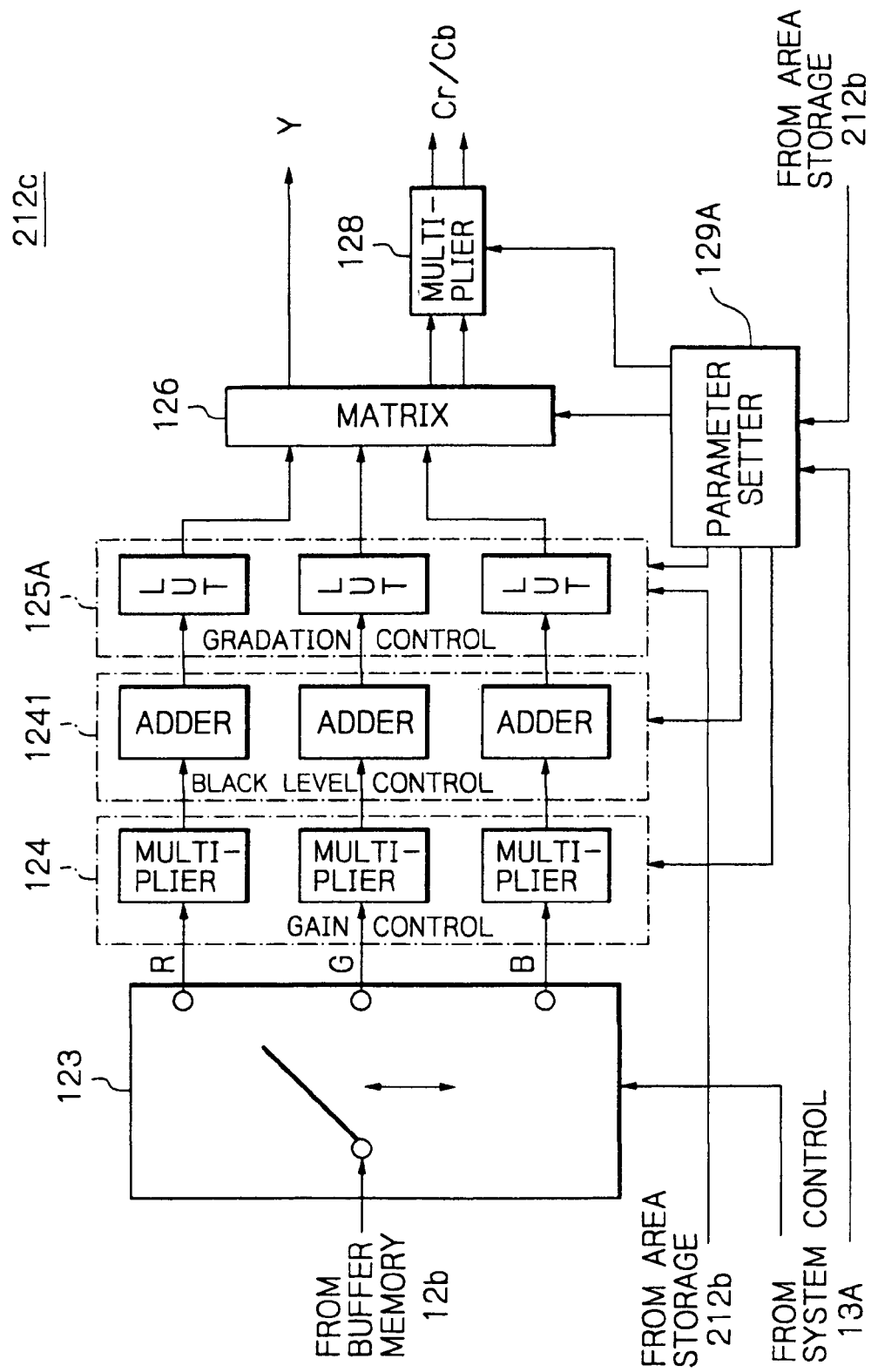
FIG. 11 is a schematic block diagram, similar to FIG. 4, showing an example of the gain adjusting circuit of the signal processor of FIG. 6.

FIG. 11 shows the exemplified configuration of the gain adjusting circuit 212c. The gain adjusting circuit 212c comprises the selector 123, the gain control 124, a black level control 1241, a gradation control (LUTs) 125A, the luminance-chrominance matrix 126, the saturation emphasizing circuit 128, and a parameter setter 129A.

Table 2 shows how the gain control 124, gradation control 125A, luminance-chrominance matrix 126, and saturation emphasizing circuit 128 convert image data during white balance correction and brightness correction described above.

TABLE 2

|  | Bracketing effect | |
| --- | --- | --- |
|  | White balance correction | Brightness correction |
| Gain | Change Kr and Kb |  |
| LUT |  | Change |
| Matrix coefficient | Change coefficient for optimum color reproduction |  |
| Saturation emphasis | Change |  |

The rows Gain, LUT, Matrix coefficient and Saturation emphasis in Table 2 represent how the parameters change during the processing of the gain control 124, gradation control 125A, luminance-chrominance matrix 126, and saturation emphasizing circuit 128, respectively. In Table 2, Kr and Kb represent the gain of R data and B data, respectively.

The settings listed in Table 2 will be described. The reason for making the brightness correction to achieve a bracketing effect was described above. The reason for making the gain, matrix coefficient and saturation emphasis change to adjust a white balance will now be described. For photographic representation, the selection of light and color temperature is important. The color temperature varies with the photographing time and photographing location. The image may be tinged with red or blue by changing the color temperature setting. This, in turn, changes the image impression.

Therefore, an image photographed at some color temperature is processed at the color temperature setting appropriately selected so that the optimum image is reproduced. Changing the saturation also emphasizes the color. This is the reason for changing color temperature or saturation during white balance correction. For this reason, the gain, matrix coefficients, and saturation emphasis are changed as listed in Table 2.

One or two of the settings of the gain, matrix coefficients, and saturation emphasis may be selectively combined.

White balance correction may be made in one of the several ways. For example, a plurality of cases are assumed with respect to the color temperature of the incident light so that the gain, matrix coefficients, and saturation emphasis settings are prepared in accordance with the respective cases of color temperature. The color temperatures to be assumed should include those for daytime light, morning and evening light, cloudy-day light, fluorescent light, and incandescent light.

Another method is to change the gain, matrix coefficients, and saturation emphasis to maintain white balance regardless of the color temperature of the incident light. Any of the methods may be used in this invention. In the specific embodiment, the color temperatures are set.

From the system controller 13A, the parameter setter 129A in FIG. 11 receives an instruction indicating how white balance correction and brightness correction are to be made, as well as the parameters to be used for these corrections, and then sets up the components of the gain adjusting circuit 212c accordingly.

More specifically, for use in the gain control 124, the parameter setter 129A has five combinations of gains Kr and Kb (corresponding to gains of an amplifier) associated with five color temperatures. In response to an instruction from the system controller 13A, the parameter setter 129A selects one of the gain combinations and outputs the selected one to the gain control 124. In this specific embodiment, the gain Kg of G data is fixed. The gain control 124 multiplies color data by the received gain. The parameter setter 129A also does the same processing for the luminance-chrominance matrix 126 and the saturation emphasizing circuit 128. The setter 129A outputs the signal indicating a gradation correction curve to the gradation control 125A. The gradation correction curve will be described later.

Next, the configuration and the operation of the gain adjusting circuit 212c will be described. The selector 123 distributes RGB data, sequentially sent from the buffer memory 12b, into R data, G data, and B data. The gain control 124 amplifies the data of each color distributed by the selector 123. More specifically, the gain control 124 receives numeric values (Kr, Kb) predetermined according to the color temperature from the parameter setter 129A and multiplies color data by the numeric values. The multiplication result will be forwarded to the gradation control 125A.

The black level control 1241 receives the addition value (positive or negative integer) from the system controller 13A via the parameter setter 129A and performs the same addition on each R, G and B color data. This processing is the same for all the pixels.

Figure 12A:
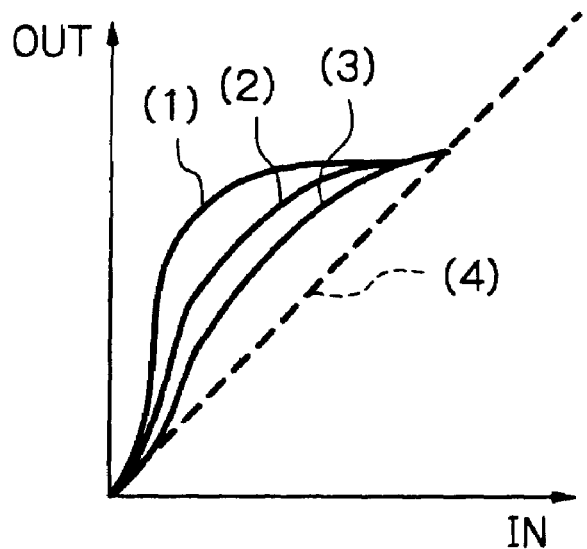
FIGS. 12A and 12B plot conversion curves used by the gradation correction of FIG. 11 to make brightness correction.
Figure 12B:
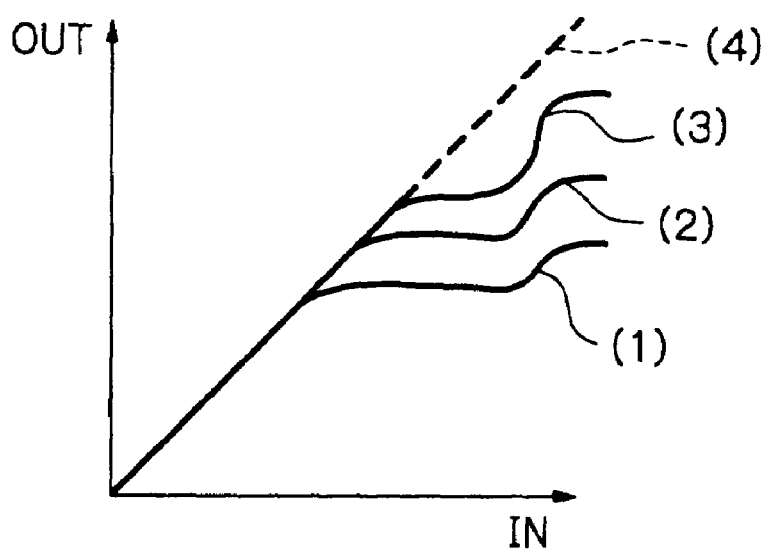

The gradation control 125A converts gradation when it receives a brightness correction instruction. At this time, the gradation control 125A receives color data and area information on each pixel from the buffer memory 12b and the area storage 212b, respectively, and also receives an instruction indicating an exposure value from the parameter setter 129A. The gradation control 125A has two gradation correction curves, one for the highlight area and the other for the shadow area, indicating the correspondence between the values of color date sent to the gradation control 125A and the values of color data to be output. The gradation control 125A converts the color data according to this correction curve. FIGS. 12A and 12B show examples of gradation correction curves. FIG. 12A plots gradation correction curves for the shadow area. The curves indicated by (1), (2), (3), and (4) correspond to the exposure values of +1.5, +1.0, +0.5, and 0.0 EV, respectively. FIG. 12B plots gradation correction curves for the highlight area. The curves indicated by (1), (2), (3), and (4) correspond to −1.5, −1.0, −0.5, and 0.0 EV, respectively. In FIGS. 12A and 12B, the horizontal axis indicates the value of input color data, and the vertical axis indicates the output value of color data with respect to the input color data.

The gradation control 125A selects one of the correction curves according to the criterion described below. A set of exposure values of the highlight and shadow areas, for example (−0.5, +1.0), is sent from the parameter setter 129A to the gradation control 125A. A gradation correction curve to be used is determined based on this information as well as information stored in the area storage 212b in the form of binary "1" and "0". Specifically, when the area information is binary "1", the curve (3) corresponding to −0.5 EV is selected from the correction curves shown in FIG. 12B. When the area information is binary "0", the curve (2) corresponding to +1.0 EV is selected from the correction curves shown in FIG. 12A. The resultant color data, thus corrected in gradation, will in turn be output to the luminance-chrominance matrix 126.

The luminance-chrominance matrix 126 performs matrix operation to convert RGB data to luminance signal Y and color difference signals Cr and Cb for optimum color reproduction at each color temperature. Matrix operation is performed according to the expressions described below.

$$Y1 = K11 \times R1 + K12 \times G1 + K13 \times B1,$$

$$Cr1 = K21 \times R1 + K22 \times G1 + K23 \times B1,$$

$$Cb1 = K31 \times R1 + K32 \times G1 + K33 \times B1, \quad (5)$$

where, R1, G1, and B1 are color data that is input to the luminance-chrominance matrix 126. They represent the red, green and blue components, respectively. K11, K12, K13, K21, K22, K23, K31, K32, and K33 are conversion coefficients. Y1 is the luminance signal that is output by the luminance-chrominance matrix 126. Cr1 and Cb1 are color difference signals output by the luminance-chrominance matrix 126. The luminance-chrominance matrix 126 has five sets of conversion coefficients, each set corresponding to one of the color temperatures. The luminance-chrominance matrix 126 selects the conversion coefficients according to the specification of the color temperature from the parameter setter 129A to perform the calculation of expression (5).

The color difference signals Cr1 and Cb1 are sent to the saturation emphasizing circuit 128. The saturation emphasizing circuit 128 receives five sets of coefficients each corresponding to one of the five color temperatures from parameter setter 129A. The received coefficients are multiplied by the color difference signals Cr1 and Cb1.

Image data thus processed by the gain adjusting circuit 212c of the signal processor 212 is transferred to the data compressor 11f shown in FIG. 7. The image data may be compressed, for example, according to the JPEG standard. The compressed image data is sent to the memory card 22 and stored therein.

Next, the operation of the electronic still camera 10A with the configuration described above will be described. The user manipulates the data input unit 11hA to specify whether to perform gain-adjusting. When the user wishes to do the gain adjusting, he or she must specify whether to make white balance and/or brightness corrections, whether the specification of the number of parameter changes is automatic and, if not automatic, the number of times the parameters are to be changed. When the user wants to do the black level offsetting, he or she must specify whether to do the offsetting.

Upon receiving the user instruction, the system controller 13A decides the number of times the white balance correction parameters are to be changed and the number of times the brightness correction parameters are to be changed. When both white balance and brightness corrections are to be made, the system controller 13A tells the signal processor 212 to do the processing the number of times equal to the number of times white balance correction parameters are to be changed multiplied with the number of times brightness correction parameters are to be changed.

In the description below, the operation will be described assuming that the user has specified that both white balance and brightness corrections are to be made, that the white balance correction parameters are to be changed three times, and that the brightness correction parameters are to be changed twice. In this case, six frames of image data will be finally obtained.

When the user depresses the shutter release button after specifying the processing mode setting, the imaging device 11c photographs an image of an object. The obtained image data is processed by the preprocessor 11d and the A/D converter 11e and then sent to the signal processor 212. After color-interpolated by the color interpolation circuit 12a of the signal processor 212, the image data is stored in the buffer memory 12b.

Since the instruction to perform the black level offsetting has been issued, the system controller 13A makes access to the buffer memory 12b to determine whether to perform addition or subtraction on the gradation values as described above. Before addition or subtraction, the system controller 13A decides the addition value or subtraction value and outputs the decided value to the parameter setter 129A.

The instruction to make brightness correction has been issued, so that the area extraction is performed. Each time an output instruction and an address are received from the system controller 13A, the image data is output from the buffer memory 12b to the area extractor 212a. The area extractor 212a extracts or distinguishes the highlight area and the shadow area from each other to store the obtained area information in the area storage 212b.

After the area extraction is finished, the image data is output from the buffer memory 12b to the gain adjusting circuit 212c each time an output instruction and an address are received from the system controller 13A. For the first three frames of image data, the gain adjusting circuit 212c uses −0.5 EV for the highlight area and +1.0 EV for the shadow area. For the last three frames of image data, the gain adjusting circuit 212c uses −1.0 EV for the highlight area and +0.5 EV for the shadow area.

The processing shown in Table 2 is repeated in the gain control 124, gradation control 125A, luminance-chrominance matrix 126, and saturation emphasizing circuit 128 of the gain adjusting circuit 212c six times while varying the parameters. The black level offsetting is also repeated six times in the black level adjuster 1241.

The image data thus processed by the gain adjusting circuit 212c is sent to the data compressor 11f for compression. After that, the image data is sequentially stored in the memory card, one frame at a time.

Unlike an auto-bracketing camera according to the prior art, the electronic still camera according to the present invention shoots an object to capture an image thereof only once. Therefore, the problem that the photographing timing differs with photographed images does not arise. As a result, the user may obtain a desired image without concerning a movement of the object, the changes of the photographing conditions, or an unintentional movement of the hands of the operator during photographing.

The illustrative embodiments of the present invention described above differ from each other only in the configuration of the buffer memory and the subsequent components of the signal processor. Because the differing components may be implemented in software, one and the same piece of hardware may be used to implement both of the illustrative embodiments when the signal processor is built with a CPU or a DSP. That means that both of the illustrative embodiments may be provided in an electronic still camera simply with the software thereof modified accordingly.

As described above, the image signal processor according to the present invention gives the user the effect, equivalent to auto-bracketing according to the prior art, by simply photographing an object only once. In addition, a plurality of images may be produced with their own gradation characteristics, color temperature, saturation, contour enhancement, data compression ratio and black level changed appropriately. Therefore, the problem that the photographing timing differs with photographed images is not involved. As a result, the user may obtain a desired image without taking account of the movement of an object, changes for the photographing conditions, or an unintentional movement of the user's hands during photographing.

The processor and the method according to the present invention allow the brightness, gradation characteristics, color temperature, saturation, contour enhancement, data compression ratio, and black level of an original image to be changed, thus making it possible to create various images that meet various purposes from one photographed image.

The entire disclosure of Japanese Patent Application No. 228950/1999 filed on Aug. 13, 1999 including the specification, claims, accompanying drawings and abstract of the disclosure is incorporated herein by reference in its entirety.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image signal processor for performing image processing on a first image signal representative of an entire image of a subject field captured by an imaging device to produce a plurality of second entire image signals, comprising:
   a first memory for storing the first image signal;
   a plurality of image processors for each performing image processing on the stored first image signal to produce the plurality of second image signals, wherein all second image signals are different from each other; and
   a second memory for storing each of the plurality of second image signals produced,
   wherein each of said plurality of image processors performs image processing on the first image signal where each image processor performs a different type of processing from every other image processor, the type of processing being selected from a group consisting of a change of brightness, a change of gradation change characteristics, a correction of a color temperature, a change of saturation, a change of a contour, and a change of a black level of the first image signal stored in said first memory,
   wherein said plurality of image processors include types and parameters of the image processing such that at least one of the types and parameters of the image processing are different between said plurality of image processors, and
   wherein said second memory is a non-volatile memory.

2. The image signal processor according to claim 1, wherein
   the parameters of image processing being of the at least one selected from the group,
   said plurality of image processors performing the image processing of the at least one selected from the group on the first image signal stored in said first memory according to the parameters of image processing.

3. The image signal processor according to claim 2, further comprising a divider circuit for dividing the first image signal stored in said first memory into a highlight area and a shadow area,
   each of said plurality of image processors performing the image processing in which at least one of the types and the parameters of the image processing differs between the highlight area and the shadow area.

4. The image signal processor according to claim 3, wherein a brightness of the highlight area is decreased or a brightness of the shadow area is increased or both.

5. The image signal processor according to claim 1, wherein each of said plurality of image processors corresponds to one of a plurality of display units which are provided for visualizing the images represented by the plurality of second image signals stored in said second memory,
   each of said plurality of image processors processing, according to the parameters, the plurality of second image signals to be displayed on one of the plurality of display units which corresponds to said image processor.

6. The image signal processor according to claim 5 wherein the plurality of display units include a display and an image printer.

7. The image signal processor according to claim 5, further comprising:
   a data compressor configured to compress the plurality of second image signals prior to being stored in the second memory,
   wherein a compression ratio for compressing each of the plurality of second image signals is based on a type of the display unit designated for the second image.

8. The image signal processor according to claim 7, wherein the compression ratio for a display is higher than the compression ratio for a printer.

9. The image signal processor according to claim 1 wherein said second memory is detachably connected to said image signal processor.

10. The image signal processor according to claim 1, wherein each of said plurality of image processors is configured to directly process the stored first image signal to produce the corresponding second image signal.

11. The image processor according to claim 1, wherein said first and second memories are different from each other.

12. The image processor according to claim 1, wherein at least one of the plurality of image processors is configured to independently perform image processing on each color of the stored first image signal to produce the corresponding second image signal.

13. An image signal processor for performing image processing on a first image signal representative of an image of a subject field captured by an imaging device to produce a second image signal, comprising:
   a first memory for storing therein the first image signal;
   a plurality of image processors for each performing image processing, different from each other, on the stored first image signal to produce a plurality of third image signals different from each other;

a second memory for storing therein the third image signals produced; and an image composer circuit for composing the third image signals to produce the second image signal, wherein said plurality of image processors include types and parameters of the image processing such that at least one of the types and parameters of the image processing are different between said plurality of image processors and wherein each of said plurality of image processors performs image processing on the first image signal where each image processor performs a different type of processing from every other image processor, the type of processing being selected from a group consisting of a change of brightness, a change of gradation change characteristics, a correction of a color temperature, a change of saturation, a change of a contour, and a change of a black level of the first image signal stored in said first memory.

14. The image signal processor according to claim 13, further comprising a divider circuit for dividing the first image signal stored in said first memory into a highlight area and a shadow area, wherein said plurality of image processors are provided correspondingly to the highlight area and the shadow area, each of said plurality of image processors performing the image processing for one of the highlight area and the shadow area to produce the third image signals.

15. The image processing method according to claim 14, wherein the second memory is non-volatile.

16. The image signal processor according to claim 13, further comprising:

a data compressor configured to compress the second image signal, wherein a compression ratio for compressing the second image signal is based on a type of the display unit designated for the second image signal.

17. The image signal processor according to claim 13, wherein the second memory is non-volatile.

18. The image processor according to claim 13, wherein said first and second memories are different from each other.

19. The image processor according to claim 13, wherein each of the plurality of image processors is configured to directly process the stored first image signal to produce the corresponding third image signal.

20. The image processor according to claim 13, wherein at least one of the plurality of image processors is configured to independently perform image processing on each color of the stored first image signal to produce the corresponding third image signal.

21. A method of processing a first image signal representative of an entire image of a subject field captured by an imaging device to produce a plurality of second entire image signals, comprising the steps of:

storing the first image signal in a first memory;

performing a plurality of image processing on the stored first image signal, each of said plurality of image processing is performed according to parameters of image processing different from each other to produce the plurality of second image signals, wherein the parameters of image processing are selected from a group including gain, gradation control, luminance-chrominance, edge enhancement, and saturation emphasis; and storing each of the produced plurality of second image signals in a second memory, wherein the second memory is a non-volatile memory.

22. The method of processing according to claim 21, wherein each of said plurality of image processing directly receives processes the stored first image signal as input produce the corresponding second image signal.

23. The image processing method according to claim 21, further comprising:

determining a compression ratio for each of the plurality of second image signals based on a type of the display unit designated for the second image signal, and compressing each of the plurality of second image signals prior storing in the second memory with the determined compression ratio.

24. The method of processing according to claim 21, wherein said first and second memories are different from each other.

25. The method of processing according to claim 21, wherein in the step of performing image processing on the stored first image signal according to parameters of image processing different from each other to produce the plurality of second image signals comprises:

independently performing, for at least one set of parameters of image processing, image processing on each color of the stored first image signal to produce the corresponding second image signal.

26. Imaging apparatus comprising:

an imaging device for capturing an image of a subject field and producing a first image signal representative of the subject field;

a first memory for storing therein the first image signal;

a plurality of image processors for each performing image processing, different from each other, on the stored first image signal to produce a plurality of second image signals different from each other;

a second memory for storing therein the second image signals produced; and an image composer circuit for composing the second image signals to produce a third image signal, said plurality of image processors including types and parameters of the image processing such that at least one of the types and parameters of the image processing are different between said plurality of image processors, the types of image processing including at least one selected from a group consisting of a change of brightness, a change of gradation change characteristics, a correction of a color temperature, a change of saturation, a change of a contour, and a change of a black level of the first image signal stored in said first memory, the parameters of image processing being of the at least one selected from the group, whereby each of said plurality of image processors performs a different type of image processing from every other processor on the first image signal stored in said first memory according to the parameters of image processing, said type of processing is selected from said group.

27. The imaging apparatus according to claim 26, further comprising:

a data compressor configured to compress the third image signal, wherein a compression ratio for compressing the third image signal is based on a type of the display unit designated for the third image signal.

28. The imaging apparatus according to claim 26, wherein the second memory is non-volatile.

29. The imaging apparatus according to claim 26, wherein said first and second memories are different from each other.

30. The imaging apparatus according to claim 26, wherein each of the plurality of image processors is configured to directly process the stored first image signal to produce the corresponding second image signal.

31. The imaging apparatus according to claim 26, wherein at least one of the plurality of image processors is configured to independently perform image processing on each color of the stored first image signal to produce the corresponding second image signal.

32. An image processing method, comprising:
retrieving a first entire image data;
generating a plurality of second entire image data based on the first image data; and
storing each of the plurality of second image data into a memory,
performing a plurality of image processing on the first image data, each of said plurality of image processing is performed according to parameters of image processing different from each other to produce the plurality of second image data;
wherein a combination of imaging parameters and values applied to generate each second image data is unique for each second image data among the plurality of second image data, the parameters of image processing selected from a group including gain, gradation control, luminance-chrominance, edge enhancement, and saturation emphasis, and
wherein the memory is a non-volatile memory.

33. The image processing method of claim 32, wherein in the step of generating the plurality of second image data includes directly processing the first image data when generating each of the plurality of second image data.

34. The image processing method of claim 32, wherein the step of generating the plurality of second image data includes particularizing at least one second image data for a display type.

35. The image processing method of claim 34, wherein the display type is one of a display or a printer.

36. The image processing method of claim 32, wherein the step of generating the plurality of second image data includes:
determining whether a brightness of the first image data is above a predetermined maximum or below a predetermined minimum; and
performing a black level correction on the first image data if the brightness of the first image data is determined to be above the predetermined maximum or below the predetermined minimum.

37. The image processing method of claim 36, wherein the step of determining whether the brightness of the first image data is above the predetermined maximum or below the predetermined minimum includes:
determining that the brightness of the first image data is below the predetermined minimum if the number of black level pixels of the first image data is greater than a first predetermined number; and
determining that the brightness of the first image data is above the predetermined maximum if the number of white level pixels of the first image data is greater than a second predetermined number.

38. The image processing method of claim 32, wherein the step of generating the plurality of second image data based on the first image data includes:
dividing the first image data into a plurality of areas, each area differing in brightness;
adjusting the brightness of the plurality of areas by a corresponding plurality of adjustment amounts; and
combining the adjusted plurality of areas.

39. The image processing method of claim 38, wherein the step of dividing the first image includes dividing the first image area into a highlight area and a shadow area, and
the step of adjusting the brightness includes reducing the brightness of the highlight area and increasing the brightness of the shadow area.

40. The image processing method of claim 39, wherein the step of adjusting the brightness includes:
reducing an exposure value of the highlight area by a first fixed value; and
increasing an exposure value of the shadow area by a second fixed value; or both.

41. The image processing method according to claim 32, further comprising:
determining a compression ratio for each of the plurality of second image data based on a type of the display unit designated for the second image data, and
compressing each of the plurality of second image data prior storing in the second memory with the determined compression ratio.

42. The image processing method of claim 32, wherein said first and second memories are different from each other.

43. The image processing method of claim 32, wherein in the step of generating the plurality of second image data comprises:
independently performing, for at least one combination of imaging parameters and values, image processing on each color of the first image data to generate the corresponding second image data.

* * * * *